US006904416B2

(12) United States Patent
Nassiri

(10) Patent No.: US 6,904,416 B2
(45) Date of Patent: Jun. 7, 2005

(54) SIGNATURE VERIFICATION USING A THIRD PARTY AUTHENTICATOR VIA A PAPERLESS ELECTRONIC DOCUMENT PLATFORM

(76) Inventor: Nicholas N. Nassiri, 11222 La Cienega Blvd., #650, Los Angeles, CA (US) 90304

(*) Notice: Subject to any disclaimer, the term of this patent is extended or adjusted under 35 U.S.C. 154(b) by 807 days.

(21) Appl. No.: 09/818,047

(22) Filed: Mar. 27, 2001

(65) Prior Publication Data

US 2002/0143704 A1 Oct. 3, 2002

(51) Int. Cl.[7] ............................................. G06F 17/60
(52) U.S. Cl. ........................... 705/51; 705/75; 713/182
(58) Field of Search ........................ 705/50–59, 64–68, 705/71–79, 8–9, 16–18, 26–27, 44; 713/156–159, 175–178, 180, 182–189, 200–202; 380/259–260, 277–285, 28–30; 707/8–10, 100–104

(56) References Cited

U.S. PATENT DOCUMENTS

| 5,422,953 | A | * | 6/1995 | Fischer ........................ 380/23 |
| 5,818,955 | A | * | 10/1998 | Smithies et al. ............ 382/115 |
| 6,073,242 | A | * | 6/2000 | Hardy et al. ................. 713/201 |
| 6,145,079 | A | * | 11/2000 | Mitty et al. .................. 713/170 |
| 6,367,013 | B1 | * | 4/2002 | Bisbee et al. ................ 713/178 |
| 6,470,448 | B1 | * | 10/2002 | Kuroda et al. ............... 713/176 |
| 6,587,945 | B1 | * | 7/2003 | Pasieka ....................... 713/176 |

FOREIGN PATENT DOCUMENTS

JP 2002024177 A * 7/2000 ........... G06F/15/00

OTHER PUBLICATIONS

Foroozesh, Protecting Your Data with Cryptography, Nov. 1996, UNIX Review, v14, n12, p 55 (6).*

* cited by examiner

Primary Examiner—James P. Trammell
Assistant Examiner—Mary Cheung

(57) ABSTRACT

The method and system of the present invention function perform signature verification using third party authenticator via paperless electronic transaction platform. The invention is particularly suited to electronic commerce transactions that require a legally binding, traditional notarization by a live notary public, albeit in a format that is compatible to and electronic commerce. A customer downloads an appropriate electronic document from an electronic document repository and inputs the required information into the electronic document. After inputting all of the required information, the customer uploads the electronic document to an electronic document repository. An electronic transaction manager determines when all of the required information from each of the parties is present and amalgamates all of the information into a single final electronic document. The parties required to execute the electronic document are notified that the electronic document is ready to be electronically signed and electronically notarized. The signatories go to a notary public or a mobile notary public may travel to a location designated by the requesting signatory. The signatory inputs a manual, hand-written signature to the electronic document, using a electronic signature capture input device. The notary public inputs a manual, hand-written signature to the electronic document, using the electronic signature capture input device. The notary public next affixes an electronic notary seal by way of the electronic notary seal input device. After affixing the notary public's signature and seal, a desktop manager automatically executes an electronic notary journal. The electronic notary journal consists of all of the information required by law to legally enforce the notarization of the electronic commerce transaction.

55 Claims, 18 Drawing Sheets

SIGNATURE VERIFICATION USING A THIRD PARTY AUTHENTICATOR VIA A PAPERLESS ELECTRONIC DOCUMENT PLATFORM

BACKGROUND OF THE INVENTION

1. Field of the Invention

The present invention generally relates to the field of signature verification with respect to on-line electronic commerce transactions. More particularly, the present invention relates to a method and system for providing signature verification using a paperless electronic document transaction platform.

2. Description of the Prior Art

Processing and closing certain paper based transactions such as a mortgage or a loan application is a well-known but complex process that involves many separate entities, diverse parties and involves multiple documents to consummate the transaction. Likewise, preparing, transferring and delivering the paper documents for signature on such document-laden transactions remains an expensive, slow, paper-based, offline process. The problems of excess documents and lapses in time time are compounded by the fact that the parties to such type transactions are typically numerous and geographically dispersed. Therefore, such type transactions incur considerable amounts of time and money to transport the necessary documents between the geographically dispersed parties. Sometimes, the diverse locations can be as far as cross-country or international. If changes are made to the documents at hand, more time and money are lost while the documents are shipped back and forth for review by the signatories. Upon completion of the documents, the signatories must then sign the documents to such type transactions in front of a notary public to ensure legal enforceability of the transaction.

Additionally, such type transactions have been largely unable to take advantage of on-line electronic commerce because of the preemptive legal/business practice requirement that a notary public authenticate the signature to bind the transaction. To date, there exists no integrated solution whereby these types of transactions can be conducted on-line using a paperless document platform that encompasses the necessary component of signature verification to conclude the transaction. Although an increasing number of such type transactions may be initiated online, they are invariably consummated off-line due to the inability to integrate the parties. Further, there exists no method of on-line notarization that meets the expectations or standards of a duly notarized signature done by a licensed notary public. Moreover, there exists no integrated process or method that integrates the parties and entities to such transactions on-line using a paperless transaction device that is accesssible by all of the parties to the transaction, including a notary public.

Nonetheless, there exists a real need to redress the problems addressing such type transactions. Although there exist solutions that claim to provide on-line "notarized" signature verification, such solutions do not comply with the standards and processes of a duly notarized signature. Notarization, legally and traditionally, requires an independent, in-person verification of the identity and signature using a live commissioned notary public who affixes a notary seal and jurat as a means of authentication. Existing products and solutions that state to be electronic "notaries" are not notarizations in the traditional sense of the word. Existing products and solutions typically use code-based digital certificates issued by a licensed certification authority as a means to verify a signature. Digital certificates are a function public key cryptography whereby a person's signature is converted to a digital code. Such processes operate so that a person's identity is verified a single time when the digital certificate is issued by the issuing authority. The applicant subsequently uses the code associated with the digital certificate each time his or her signature is required. The end result being that a signatory may use the digital certificate to unilaterally affix a "notarized" signature to an electronic document, when in fact a notary is not present, nor has a notary verified the identity of the signatory. The problem associated with public key cryptography methods is that while the certification authority is capable of issuing a certificate that correspond to an applicant, it is unable to verify the identity of the person who is signing the electronic document at the time the digital certificate is used. The inability of public key cryptography to guarantee a person's identity, has precluded such type transactions from effectively electronic based commerce to conclude such transactions.

The prior art reveals the following six (6) prior art patents are found to be related to the field of signature verification although none of them provide an integrated approach to signature verification using a paperless electronic document platform.

1. U.S. Pat. No. 5,742,685 issued to Berson et al. on Apr. 21, 1998 for "Method For Verifying An Identification Card And Recording Verification Of Same" (hereafter the "Berson Patent"). The Berson Patent discloses a method for verifying an identification card and recording verification of the same. The identification card includes information on a first portion of the card, the information including personal information relating to the person to be identified, and an encrypted representation of at least part of the information on a second portion of the card, the part including the personal information. The encrypted information can be read from the card and then decrypted to obtain a decrypted representation. The card is then verified by comparing the decrypted representation of the information with the information on the first portion of the card and the personal information is stored as at least part of a record of the verification transaction. The Berson Patent further discloses a record system which includes a source identification such as a machine number and a secure tamper proof clock.

2. U.S. Pat. No. 5,912,974 issued to Holloway et al. on Jun. 15, 1999 for "Apparatus And Method For Authentication Of Printed Documents" (hereafter the "Holloway Patent"). The Holloway Patent discloses an apparatus and method for authentication of printed documents. The printed documents are scanned and digitized using a conventional scanner. The scanned and digitized document contents are edited before being used to generate a digital signature. This allows reading errors which could invalidate a subsequent verification process to be corrected. Using the editor and an input device, the signing authority identifies on the screen different segments of the document. Each segment contains data of a single type and selects a set of rules, among a group proposed by the system, for authenticating the document. Then, for each segment, an edited digital form of the data contents is derived using the method defined in the rules. A hash value of the rules used and the edited digital form of the segment contents is calculated using a public hashing algorithm. Then the apparatus generates a digital signature of the edited digitized segment contents using the secret key of the authenticator. Finally, an authentication code comprising the edited digital form of each segment and the digital signature is printed on the document. To verify the authenticity, the printed document is scanned and digitized again and the digital signature is checked by using the associated public key. If the check fails, the verifier identifies which segment has been scanned differently, comparing it with the related edited digital form in the authentication code printed on the document to evaluate its validity.

3. U.S. Pat. No. 5,872,848 issued to Romney, et al. on Feb. 16, 1999 entitled, "Method and apparatus for witnessed authentication of electronic documents." The Romney patent consists of a method and apparatus for authenticating an electronic document using an electronic document authenticator. An electronic document authenticator is an individual or enterprise that has been authorized by the inventor witness a digital signature. The Romney patent does not use a licensed notary public nor does the Romney patent perform a method of notarization. Rather, the Romney patent is a form of public key encryption verification whereby the customer enters a digital code, presumed to be the equivalent of his or her written signature, in the presence of the authenticator. The authenticator verifies the digital certificate belongs to the customer that used it by using a corresponding public key provided by the same customer. The Romney patent essentially ascertains that the public key supplied to the authenticator by the customer matches the private key used by the customer to produce the digital signature. The Romney patent fundamentally is a solution to deal with one of the most common problems associated with public key cryptography: identity theft. It is not a form of a method of traditional notarization. The Romney patent is premised on the issuance of digital certificates to be used by all parties, including the authenticator, to attest to the veracity of a document, as opposed to the authenticity of an identity and corresponding signature, per the method of a traditional notarization performed by a licensed notary public.

4. U.S. Pat. No. 5,926,551 issued to Dwork et al. on Jul. 20, 1999 for "System And Method For Certifying Content Of Hard-Copy Documents" (hereafter the "Dwork Patent"). The Dwork Patent discloses a system and method for certifying content of hard-copy documents. A digital representation of the data object is produced, typically, for hard-copy documents to produce a two dimensional bit map. Then, a signature for the digital representation is obtained from a certifying agent. The signature is produced as a function of the digital representation of the data object, so as to reflect the content of the data object. This will commonly be performed by a certifying agent, such as a post office clerk or a notary public. As a result, a representation of the signature, along with the data object is provided. Accordingly, it is established that the signature authenticates the content of the data object.

5. U.S. Pat. No. 5,940,187 issued to Berke on Aug. 17, 1999 for "Method For Certifying Facsimile Communication Over A Telephone Network" (hereafter the "Berke Patent"). The Berke Patent discloses a method for certifying facsimile communications over a telephone network. The method includes a registration sequence during which an originator of facsimile messages establishes an account with the certifying system by providing a handwritten signature and identifying data. The handwritten signature is linked to the identifying data, and the identifying data is utilized through the method in an effort to insure the authenticity of facsimile messages certified by the certifying system.

6. U.S. Pat. No. 5,973,731 issued to Schwab on Oct. 26, 1999 for "Secure Identification System" (hereafter the "Schwab Patent"). The Schwab Patent discloses a secure identification system for providing a secure interactive communication of text and image information between a central server computer and one or more client computers, located at remote sites for the purpose of storing and retrieving files describing and identifying unique products, services or individuals.

A major problem to conducting electronic commerce that requires signature verification, is that to date there exists no method whereby electronic documents can be electronically notarized using the traditional and legally binding method by a live, licensed notary public.

A major problem to conducting electronic commerce, is that to date there exists no method whereby electronic documents are integrated and managed using a paperless document platform that eliminates the need to physically transport documents to be signed and notarized.

It is desirable to provide a new method and system for providing signature verification with the capability of signing and notarizing electronic documents at remote locations without the need to physically transport the hard copies of such documents to the remote locations to be signed by the signatories and notarized by a notary public. While the devices created by the prior art may be suitable for the particular purpose to which they address, they are not as suitable for signature verification for electronic commerce transactions that typically require the traditional form and security of an in-person notarization.

In view of the foregoing disadvantages inherent in the known prior art, the present invention provides a new method for providing and performing notary services on-line with the capability of electronically transporting, signing and notarizing the electronic documents. In this respect, the method of signature verification with the capability of electronically transporting, signing and notarizing the electronic document according to the present invention, substantially departs from the conventional concepts and designs of the prior art, and in so doing provides an apparatus primarily developed for the purpose of performing notary services via the Internet with the capability of electronically signing and notarizing the electronic document at a remote location. Further novel features and other objects of the present invention will become apparent from the following detailed description, discussion and the appended claims, taken in conjunction with the drawings.

SUMMARY OF THE INVENTION

The general purpose of the present invention, which will be described subsequently in greater detail, is to provide a new method of electronic notarization by a notary public using a paperless document platform that is not anticipated, rendered obvious, suggested, or even implied by any of the prior art, either alone or in any combination thereof.

Described briefly, the method and system of the present invention function to provide and perform signature verification using a live notary public and a paperless electronic transaction platform. The invention is particularly suited to electronic commerce transactions that require a traditional notarization by a live notary public, albeit in a format that is compatible to electronic documents. A customer wishing signature verification for an electronic document runs a desktop manager on the browser of a local computer system to interface with the functions and features of the present invention. To initiate a transaction, the customer first must register with an electronic transaction manager which structures the transaction request and manages the transaction cycle. Upon registering with the electronic transaction manager, a customer may download an appropriate electronic document or set of electronic documents (referred to as the "electronic document") from an electronic document repository. After downloading an electronic document, the electronic transaction manager assigns a password and a name to the electronic document. The customer inputs the required information into the electronic document using a local computer system. After inputting all of the required information, the customer uploads the electronic document to the electronic document repository. The electronic transaction manager records the transaction in the electronic transaction manager database, and posts the electronic document for retrieval by a subsequent authorized party. A subsequent authorized party downloads the electronic document using an access password and the document name. Several subsequent authorized parties may access a single electronic document, singularly or simultaneously.

The parties to the transaction communicate with one another via the electronic transaction status board. The electronic transaction status board allows the parties to have constant and instant information and communication that is readily accessible. The electronic transaction status board functions as a virtual message center where the parties may inform one another of the respective status of the electronic documents. Likewise, the electronic transaction status board functions to post information from the electronic transaction manger regarding the status of the electronic document and to post other information regarding the transaction cycle.

The electronic transaction manager determines when all of the required information from each of the parties is present and amalgamates all of the information into a single final electronic document. The electronic document is encrypted and assigned a corresponding temporary signing password. The temporary signing password is distinct from the initial password and the access password assigned to the electronic document. Upon assigning a temporary signing password, no information may be added, deleted or modified to the electronic document prior to signature. The parties required to execute the electronic document are notified that the electronic document is ready to be electronically signed and electronically notarized. Each signatory is given the electronic document's name and the corresponding temporary signing password. The signatories go to a notary public or a mobile notary public may travel to a location designated by the requesting signatory. The signatory reveals the electronic document's name and corresponding temporary signing password to the notary public, who downloads the electronic document. The desktop manager highlights or otherwise indicates each and every place where a signature or the initials of the signatory are required in the electronic document. The signatory inputs a manual, hand-written signature to the electronic document, using a electronic signature capture input device. The notary public inputs a manual, hand-written signature to the electronic document, using the electronic signature capture input device. The notary public next affixes an electronic notary seal to the electronic document where indicated by the desktop manager. The notary public affixes the notary seal by way of the electronic notary seal input device. After affixing the notary public's signature and seal, the desktop manager automatically executes the electronic notary journal. The electronic notary journal creates an independent electronic record of the notarization that remains in the sole possession of the notary public. The electronic notary journal consists of all of the information required by law to legally enforce the notarization of the transaction. After recording the transaction in the notary journal, the signed, notarized electronic document is encrypted and a time/date stamp is applied. Any changes made to the electronic document after this point in time invalidate the electronic document.

It has been discovered, according to the present invention, that if transactions requiring traditional notarization can be electronically notarized using an in-person method of notarization and a paperless transaction platform, such type of transactions can be conducted on-line thereby saving substantial amounts of time and money.

It has been discovered, according to the present invention, that if the access and transport of electronic documents and notary public services can be accomplished online, that the executed electronic documents can be rapidly verified and validated without waiting for paper documents to be physically shipped to a remote location or without having the parties travel to a remote location, thereby saving substantial amounts of time and money.

It has been discovered, according to the present invention, that if notary services using a paperless transaction platform can be accomplished online, then sensitive agreements, or high-value transactions and the like, which traditionally and legally require a notary seal, do not sit on hold and can be executed more rapidly and efficiently.

It has additionally been discovered, according to the present invention, that if notary services paperless transaction platform can be accomplished online, it reduces courier costs and possible delay by the couriers who transport the documents to remote locations to be signed.

It is therefore an object of the present invention to provide a method for performing signature verification using a notary public and a paperless transaction platform, with the capability of rapidly signing and notarizing electronic documents at remote locations without physically transporting the documents to the remote location to be signed by signatories and notarized by a participating notary public at the remote location.

It is a further object of the present invention to provide a method and system for providing and performing electronic notary services using a paperless document platform, where notarizations can take place at the notary's place of business having internet access or wherever there is internet access.

It is a further object of the present invention to utilize the most trusted and secure form of identity and signature verification, a licensed notary public, to execute binding legal electronic documents.

It is a further object of the present invention to enable high value or sensitive electronic document transactions requiring an in-person notarization to be conducted on-line using a paperless electronic document platform.

It is a further object of the present invention to integrate all of the parties to high value or sensitive transactions on-line by providing a standardized set of electronic documents that are accessible on-line and interchangeable among the parties on-line, including the notary public.

It is still a further object of the present invention to provide a method and system for verifying and identifying an electronic signature of a signatory by providing a key, code or pin number to the signatory so that the signatory can use the pin number at a later time to verify and identify his or her digital signature to a requesting party, vendor etc.

There has thus been outlined, rather broadly, the more important features of the invention in order that the detailed description thereof may be better understood, and in order that the present contribution to the art may be better appreciated. There are additional features of the invention that will be described hereinafter. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Referring particularly to the drawings for the purpose of illustration only and not limitation, there is illustrated:

FIG. 3A depicts the electronic transaction manager assigning an internal reference number/code that is distinct from the electronic document name and password code, FIG. 3B depicts the electronic transaction manager assigning the electronic document a name and password code, FIG. 3C depicts the customer assigning the electronic document a name and password code, FIG. 3D depicts the electronic transaction manager using the foregoing internal reference number/code, and the electronic document a name, and the password code assigned to the electronic document to manage the transaction cycle;

DETAILED DESCRIPTION OF THE PREFERRED EMBODIMENT

I. Description of Present Invention

Although specific embodiments of the present invention will now be described in detail and with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
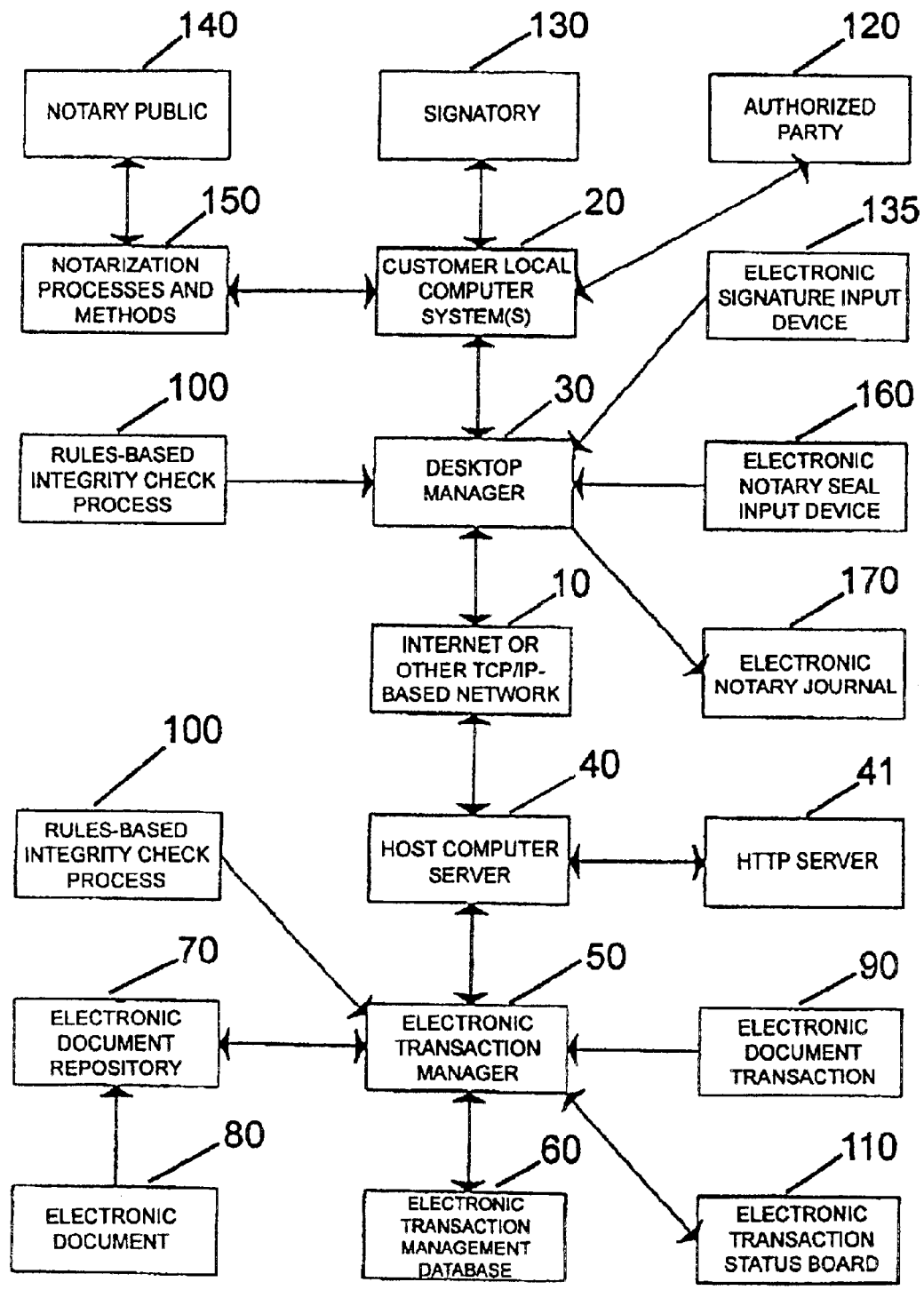
FIG. 1 is a flow chart diagram that illustrates the exemplary embodiment of the present invention.

With reference to FIG. 1, the method and system of the present invention comprises a customer 5, the internet or other TCP/IP based networks 10, a customer local computer system 20, a desktop manager 30, a host computer server 40, an electronic transaction manager 50, an electronic transaction management database 60, electronic document repository 70, an electronic document 80, an electronic transaction 90, a rules-based integrity check 100, an electronic transaction status board 110, other authorized parties 120, a signatory 130, an electronic signature input device 135, a notary public 140, notarization processes and methods 150, an electronic notary seal input device 160, and an electronic notary journal device 170.

Any party to an electronic transaction that requires signature verification, the "customer" 5, may initiate a notarization request to electronic transaction manager 50 using a customer local computer system 20. The customer 5 may be, but need not be, the signatory 130, whose signature is to be notarized by a notary public 140. For example, a loan officer, an escrow officer, or a regulatory agency may be the customer 5 that inputs information 190 into an electronic document 80 that eventually will be signed by a different signatory 130, for example, a loan applicant. The customer 5 accesses the present invention using a local computer system 20 from a remote location (i.e. the home, office, or a laptop) that establishes internet or TCP/IP connectivity 10 with the host computer server 40 using the desktop manager 30. The desktop manager 30 runs on the browser 21 of the local computer system 20 and provides the interface that allows the customer 5 to operate the present invention by the processes and methods described herein. Likewise, the desktop manager 30 runs on the browser 21 of the customer local computer system 20 of the notary public 140 and provides the interface that allows the notary public 140 to operate the present invention by the processes and methods described herein. With respect to the customer 5, the desktop manager 30 is the interface that allows the customer 5 to access the present invention, establish a registration account 55 with the electronic transaction manager 50, navigate the electronic document repository 70, to download and upload 180 an electronic document 80 from the electronic document repository 70, to access the electronic transaction status board 110, and to input an electronic signature 245 onto the electronic document 80 using the electronic signature input device 135.

With respect to the notary public 140, the desktop manager 30, is the interface that allows the notary public 140 to establish a registration account 55 with the electronic transaction manager 50, to download and upload 180 an electronic document 80 from the electronic document repository 70, to access the electronic transaction status board 110, to input an electronic signature 245 onto the electronic document 80 using the electronic signature input device 135, to input an electronic seal 164 using the electronic notary seal input device 160, to execute notarization processes and methods 150, to execute the electronic notary journal 170 and to authenticate the notary public 140 as being authentic 144.

The electronic transaction manager 50 is an application that manages the paperless document transaction from the point of initiation by the customer 5 to the end point of notarization 150 by a notary public 140. Initially, the customer 5 registers with the electronic transaction manager 50 which in turn establishes a customer registration account 55 in the electronic transaction manager database 60. The customer registration account 55 is the basic upon which the electronic transaction manager 50 correlates electronic documents 80 and keeps a record of the parties to a transaction. The electronic transaction manager 50 is a function of the host computer server 40. The electronic transaction manager 50 tracks and manages each electronic document 80 registered within the electronic transaction management database 60 using the registration information described fully below as a tracking mechanism and associating the information of the electronic transaction 90 with a particular customer registration account 55. The electronic transaction manager 50 also serves to authorize access by the other authorized parties 120 and the notary public 140 to a single electronic document 80, even though the other authorized parties 120 may be geographically remote, whether it be another city, another state, or another country.

The electronic document repository 70 consists of various electronic documents 80 that are specific to certain transactions and certain sectors or industries. For example, the electronic document repository 70 may consist of electronic documents 80 for the financial and banking sector, the real estate sector, or government/ regulatory agencies and the like. The electronic documents 80 may be listed by type; i.e. deeds of trust, or by category; i.e. banking documents. A customer 5 may opt to post a "restricted access group" within the electronic document repository 70. A restricted access group consists of confidential electronic documents 80 that are proprietary to a specific customer 5 and may only be accessed or utilized by the registered customer 5. The restricted access group is password protected. In any category, the electronic document 80 may be represented singularly, or as a grouped set of electronic documents 80 (collectively referred to as the "electronic document"). The electronic document repository 70 may be used in conjunction with a request for signature verification or independently. In either scenario, the transaction must be initiated via the desktop manager 30 and managed by the electronic transaction manager 50 as described herein.

The electronic transaction manager 50 further consists of an electronic transaction status board 110. The electronic transaction status board 110 functions as an on-line virtual message communication center. The electronic transaction status board 110 automatically receives electronic transaction information 90 from the electronic transaction manager 50. That is, upon a successful upload of the electronic document 80 to the electronic document repository 70, the electronic transaction manager 50 automatically posts the time, date, and the party that posted the electronic document 80 to the electronic transaction status board 110. Likewise, the electronic transaction manager 50 posts when a transaction cycle is complete, including the time and date of notarization on the electronic transaction status board 110. The electronic transaction status board 110 further functions as a virtual message center where the various parties to the transaction may inform one another of the respective status of the electronic document 80, i.e. a lender may be waiting on an appraisal, or the signatory 130 may be ill and unable to conclude the transaction at this point in time. Likewise, the parties may post questions or requests for other parties on the electronic transaction status board 110.

The electronic signature input device 135 is a device that is remote 125 to the customer local computer system 20 or is a function embedded within the customer local computer system 20. The electronic signature input device 135 captures the manual, hand-written signatures of the signatory 130 and the notary public 140. The desktop manager 30 indicates on the browser 21 of the customer local computer system 20 where the electronic signature 245 of the signatory 130 and the notary public 140 are to be input into the electronic document 80. The desktop manager 30 affixes the captured electronic signature 245 of the signatory 130 and the notary public 140 to the electronic document 80. The electronic notary seal input device 160 is a device that is remote to the customer local computer system 20 that operates in conjunction with a function embedded within the desktop manager 30. Alternatively, electronic notary seal input device 160 is a device that is embedded in the customer local computer system 20 that operates in conjunction with a function embedded within the desktop manager 30. The electronic notary seal input device 160 executes an electronic notary seal 244 or an electronic notary jurat (collectively referred to as the "notary seal") of the notary public 140 to the electronic document 80. The desktop manager 30 indicates on the browser 21 of the customer local computer system 20 where the electronic notary seal 164 is to be input into the electronic document 80, and the desktop manager 30 affixes the captured electronic notary seal 164 to the electronic document 80. The electronic notary journal 170 is a function of the desktop manager 30. The electronic notary journal 170 executes upon a notary signature 245 and seal 164 being affixed to the electronic document 80. The electronic notary journal 170 contains all of the verification information of the transaction required by law. The electronic notary journal 170 is a record that remains in the sole possession of the notary public 140 to whom it belongs.

II. Operation of the Present Invention

The method and system of the present invention function to provide and perform signature verification services by a live notary public 140 via the internet or other TCP/IP based network 10 using a paperless document platform which consists of a customer local computer system 20, a desktop manager 30, a host computer server 40, an electronic transaction manager 50, an electronic transaction management database 60, electronic document repository 70, an electronic document 80, an electronic transaction 90, a rules-based integrity check 100, an electronic transaction status board 110, other authorized parties 120, a signatory 130, an electronic signature input device 135, a notary public 140, notarization processes and methods 150, an electronic notary seal input device 160, and an electronic notary journal device 170.

With reference to FIG. 1, a customer 5 with internet or TCP/IP connectivity 10 may either a website, a local access network (LAN) or a wide access network (WAN) using a client-server infrastructure, to provide the point of access to the present invention. In the preferred embodiment of the present invention, the request for signature verification using a paperless document platform is initiated by the customer 5 accessing a website on the world-wide-web using the customer local computer system 20. The website provides the customer 5 with information about the services available and information in the form of a tutorial on how to register with, and use the present invention. Alternatively, the invention may be configured for use an a restricted LAN or a restricted WAN.

Figure 2:
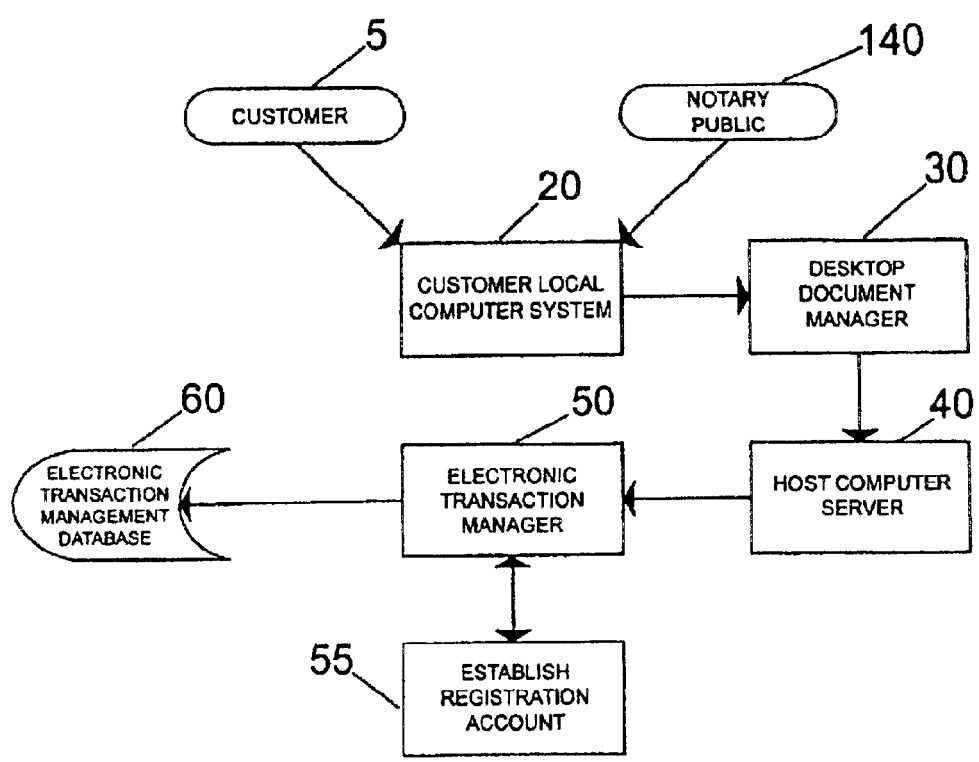
FIG. 2 is a flow chart diagram that illustrates the customer and notary public registering to use the present invention.

With reference to FIG. 2, registration with the electronic transaction manager 50 is a prerequisite to using the present invention by the customer 5 and the notary public 140. The customer 5 and the notary public 140 establish a registration account 55 in the same manner but for different reasons. The customer 5 and the notary public 140 establish a registration account 55 with the electronic transaction manager database 60 by inputting registration information from the customer local computer system 20. With respect to the customer 5, registration enable the electronic transaction manager 50 to correlate electronic documents 80 selected by the customer 5 with that particular customer 5 and with all other authorized parties 120 as identified by the customer 5, during the registration process. Registration further allows the electronic transaction manager 50 to associate all electronic document transactions 90 with that particular registration account 31 which is integral to the function of the present invention for the purpose of managing the electronic document transaction cycle, (as more fully described below with reference to FIGS. 3A through 3D). With respect to the notary public 140, registration entails the notary public 140 providing verification information to register with the present invention as a duly licensed notary public 140. The notary public registration account 55 is recorded in the electronic transaction manager database 60, and is subject to verification by the rules-based integrity check 100 prior to the desktop manager 30 executing the notarization processes and methods 150.

Figure 3A:
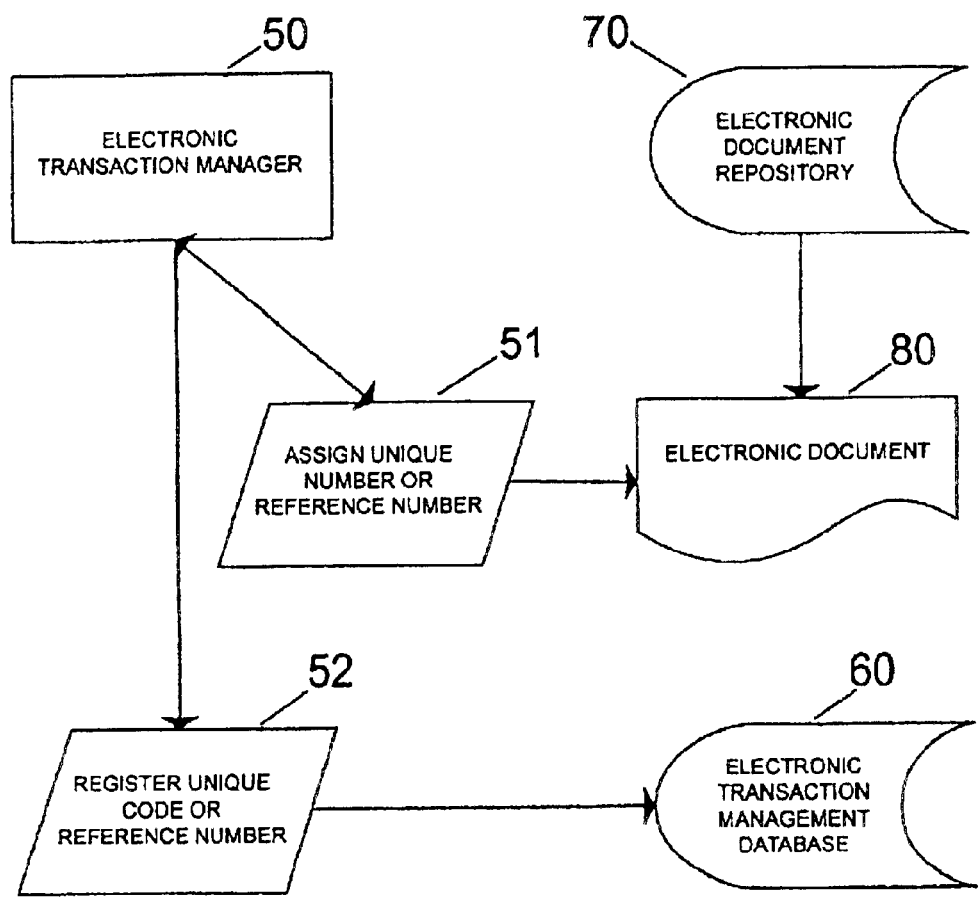
FIGS. 3A–3D are a series flow chart diagrams that illustrate the exemplary method for using the electronic transaction manager to manage the paperless document transaction according to the method of the present invention.
Figure 3B:
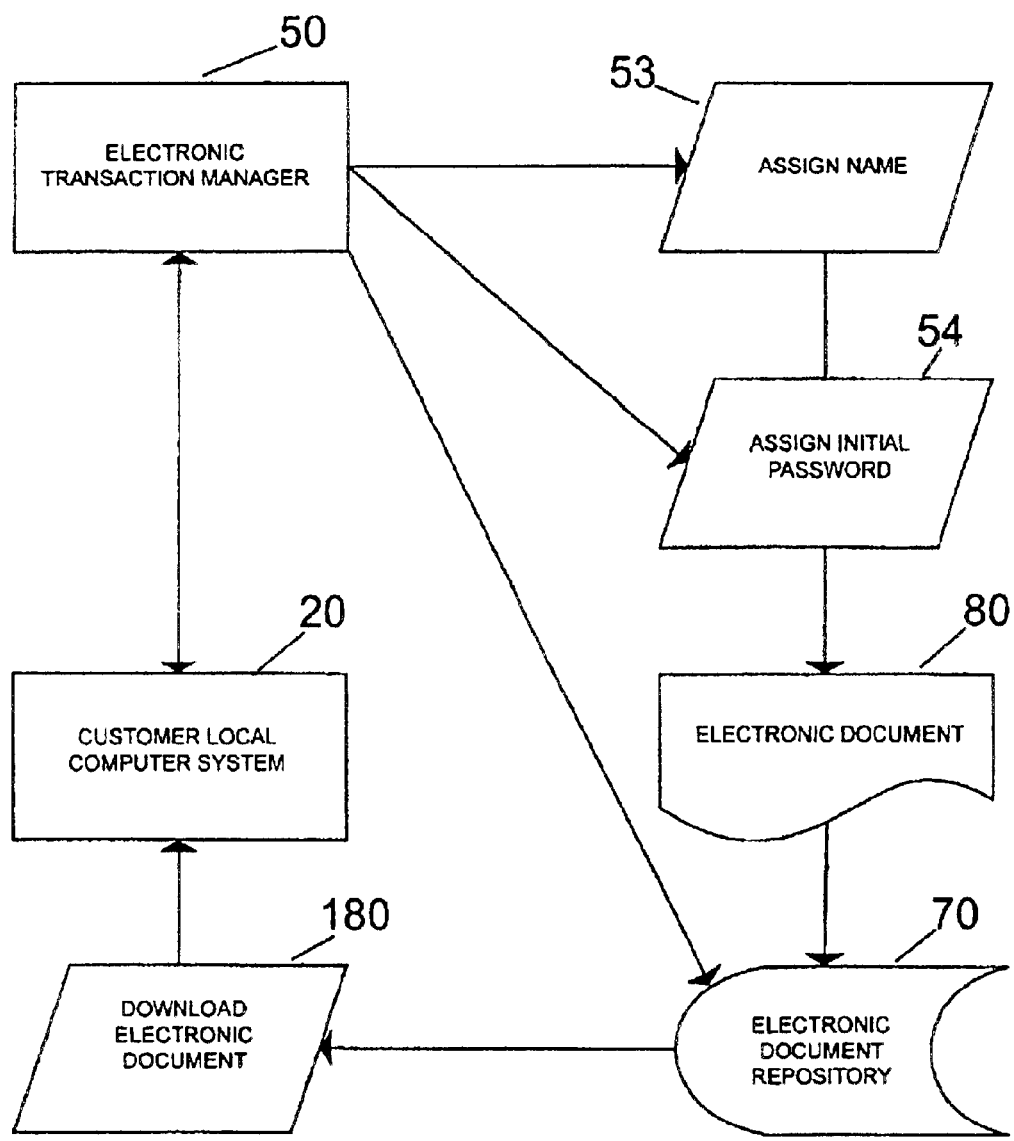
Figure 3C:
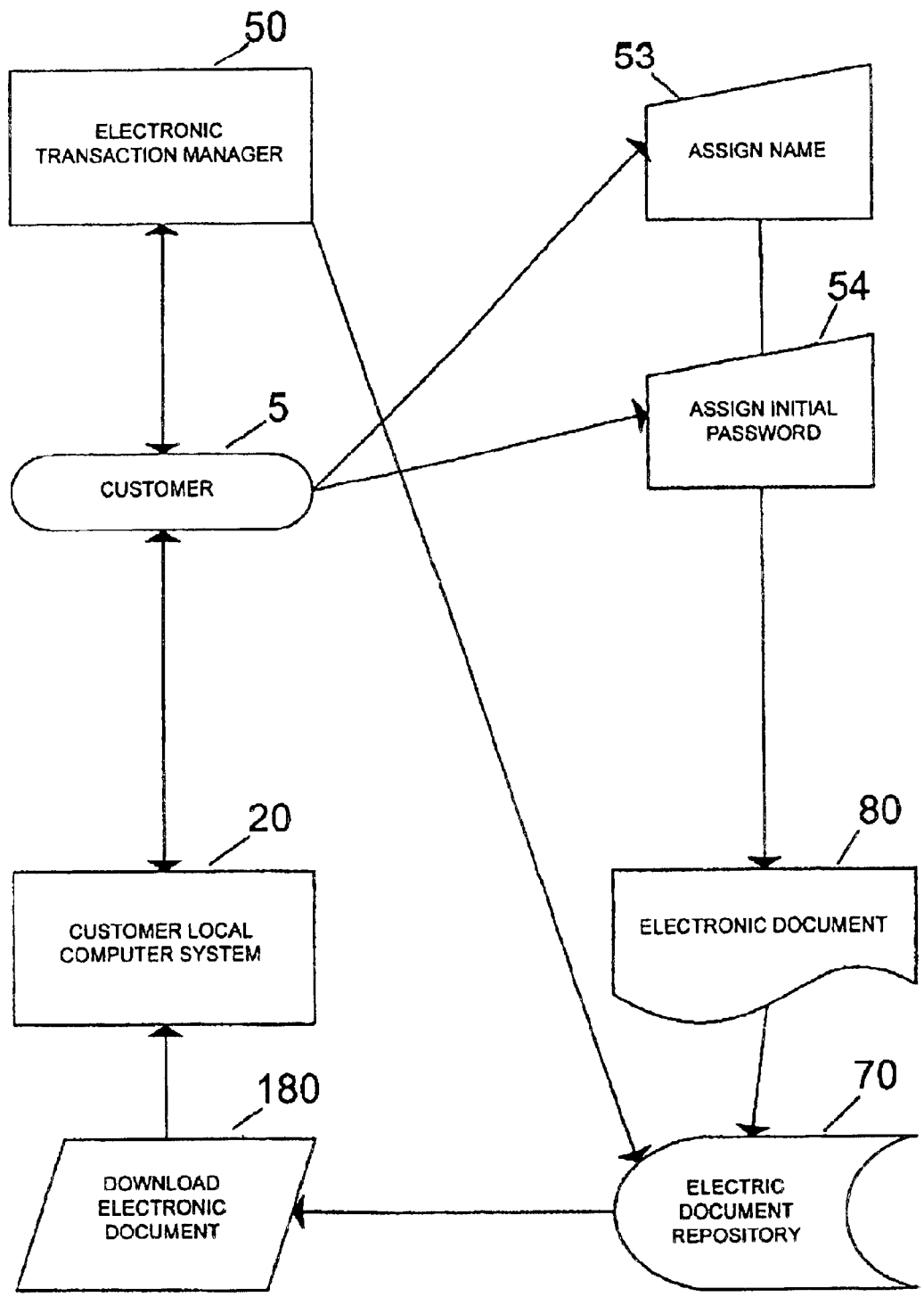
Figure 3D:
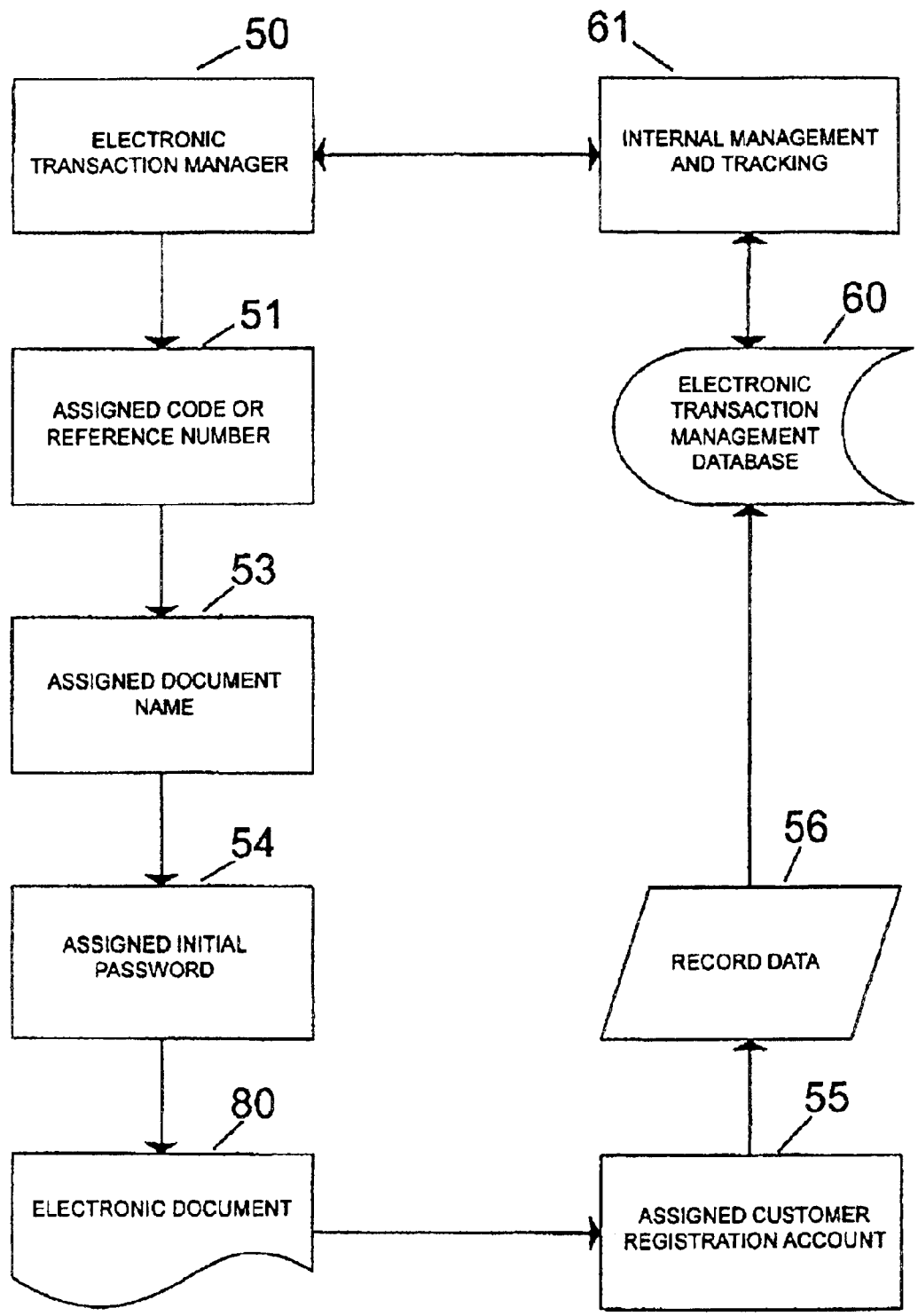

With reference to FIGS. 3A through 3D, after establishing a registration account 55 with the electronic transaction manager database 60, the customer 5 selects the electronic document 80 required to be managed by the electronic transaction manager and to be notarized by the notary public 140. With reference to 3A, each electronic document 80 is assigned 51 a code or a form of internal identification 52 by the electronic transaction manager 50 as a priori, this code or reference number 52 is separate and distinct from the registration account 55. Upon a customer 5 selecting an electronic document 80 from the electronic document repository 70, the electronic transaction manager 50 automatically correlates the electronic document 80 to the customer registration account 55 by way of the code or reference number 52. With reference to FIG. 3B the electronic transaction manager 50 further assigns a password 54 and a document name 53 to each electronic document 80 selected by the customer 5. Alternatively, with reference to FIG. 3C, the customer 5 may input a document name 53 and corresponding password 54 to the electronic document 80. Otherwise, the customer 5 may opt to use the default document name 53 and corresponding password 54 provided by the electronic transaction manager 50. With reference to FIG. 3D, upon assigning a document name 53 and a corresponding password 54, the electronic transaction manager 50 automatically registers 56 each electronic document 80, its corresponding code 52, document name 53, password 54 and correlating customer registration account 55 in the electronic transaction manager database 60.

Figure 4A:
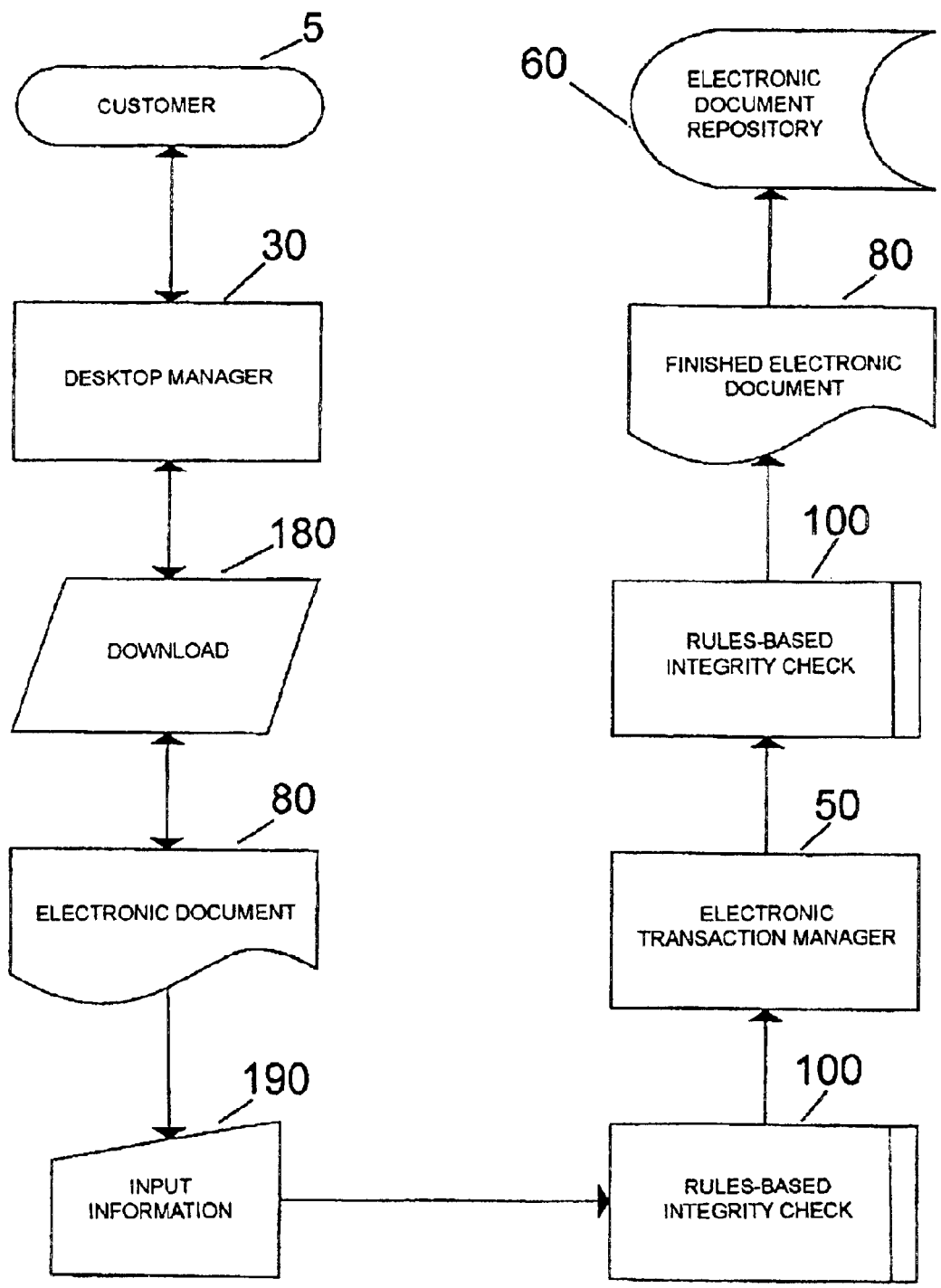
FIGS. 4A–4C are flow chart diagrams that illustrate the customer and other authorized parties accessing the electronic document according to the method of the present invention.

With reference to FIG. 4A, upon the download of a particular electronic document 80 from the electronic document repository 70, the desktop manager 30 displays the selected electronic document 80 on the browser 21 of the customer local computer system 20. The desktop manager 30 directs the customer 5 to each place in the electronic document 80 where information 190 is required to be input into the electronic document 80 by the customer 5. In the preferred embodiment, the electronic document 80 appears as a graphical representation on the browser 21 of the local computer system 20, and areas in the electronic document 80 requiring information to be input 190 shall be highlighted or otherwise indicated by the desktop manager 30. Alternatively, the electronic document 80 appears as a graphical representation on the browser 21 of the local computer system 20 alongside fields; information being input into these fields that appear in the graphical representation of the electronic document 80. Information may be comprised of varied sorts, including personal information such as a driver's license, numerical information such as a purchase price, expert opinion, and the like. The desktop manager 30 further determines which fields where information is to be input are restricted and which fields are permissive. That is, certain parties may be prohibited from inputting information 190 into restricted fields in the electronic document 80. The determination of which fields are restrictive is made by the customer 5 during the registration process, or in some instances, after downloading the electronic document 80, but always prior to posting the electronic document 80 for retrieval by a subsequent authorized party 120.

With reference to FIG. 4A, upon inputting the required information 190 into the electronic document 80 using the customer local computer system 20, the customer 5 uploads the electronic document 80 to the electronic document repository 70 for retrieval by a subsequent authorized party 120. Subsequent authorized parties 120 are identified by the customer 5 in the customer registration account 55. The desktop manager 30 executes the rules-based integrity check 100 to ensure that all of the required information is present before permitting the electronic document 80 to upload to the electronic document repository 70. The rules-based integrity check 100 entails that the following criteria are met: (i) all of the required information is present; and (ii) the electronic document 80 has not been altered in any way, with the exception of the permissive information input. If the electronic document 80 fails the rules-based integrity check 100, in the first instance (i) the desktop manager 30 alerts the customer 5 with instructions to complete the missing information and reload the electronic document 80 to the electronic document repository 70. If the electronic document 80 fails the rules-based integrity check 100 in the second instance (ii), the desktop manager 30 alerts the customer 5 that the electronic document 80 may not be uploaded to the electronic document repository 70. Once the electronic document 80 is uploaded to the electronic document repository 70 for retrieval by a subsequent authorized party 120, no subsequent authorized party 120 may alter information entered by a previous authorized party 120 or by the customer 5.

Upon a customer 5 uploading an electronic document 80 to the electronic document repository 70, the electronic transaction manager 50 automatically runs a rules-based integrity check 100. The rules-based integrity check 100 entails confirming that the following criteria are met: (i) all of the required information is present in the electronic document 80; (ii) that the electronic document 80 corresponds to a registration account 55; and (iii) that the electronic document 80 has not been altered in any way, with the exception of permissive information being added to the electronic document 80. Should these criteria fail, the electronic transaction manager 50 will not accept the electronic document 80 to be posted in the electronic document repository 70. After passing the rules-based integrity check 100, the electronic transaction manager 50 records the transaction status 90 in the electronic transaction manager database 60 and posts the electronic document 80 for retrieval by a subsequent authorized party 120.

Figure 4B:
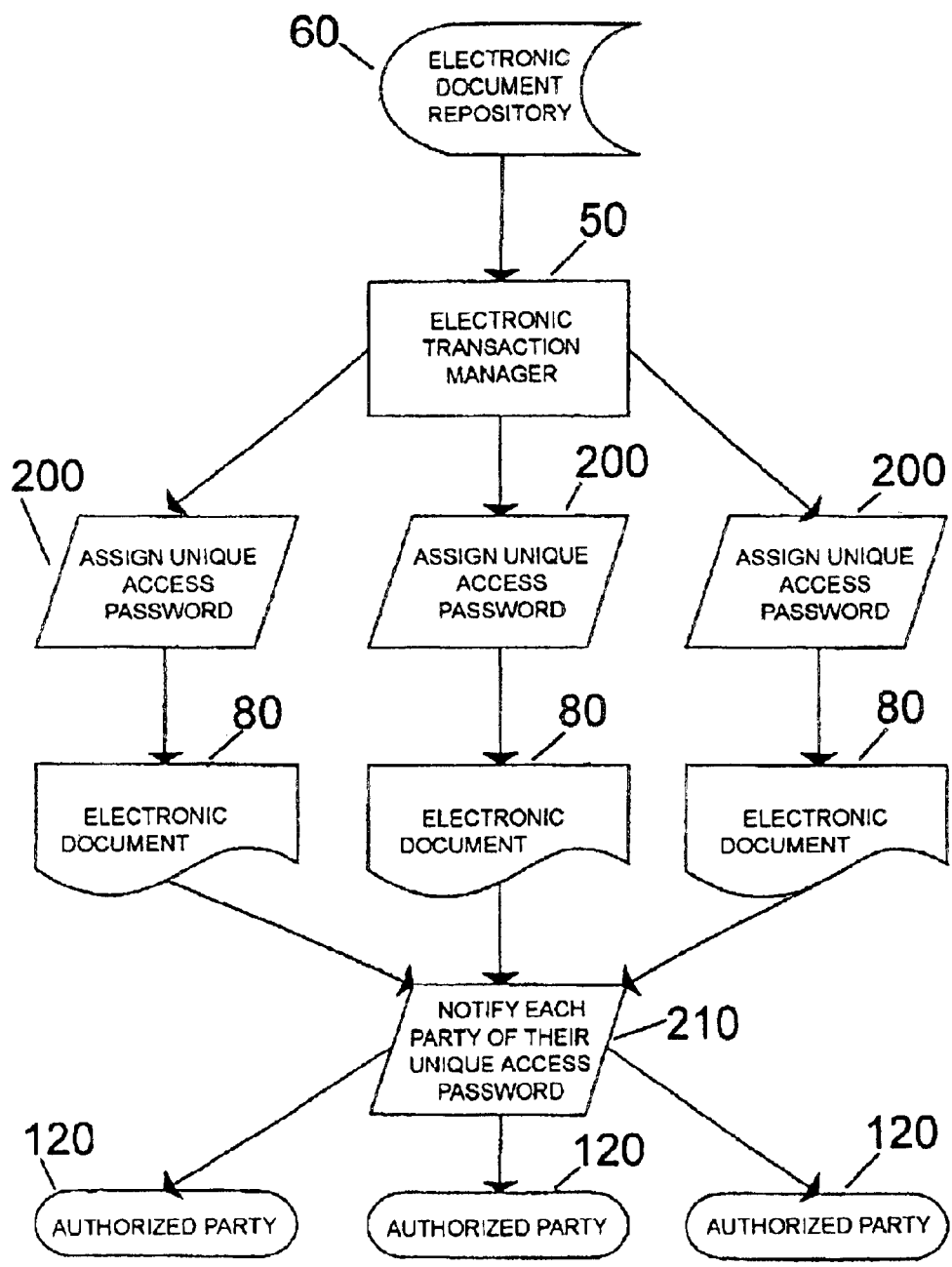

With reference to FIG. 4B, an authorized party 120 is an individual or entity identified by the initial customer 5 in the registration account 55 as being allowed to access the electronic document 80. The electronic transaction manager 50 assigns and disseminates 210 an access password 200 to the other authorized party 120 per the instructions of the initial customer 5. The access password 200 permits the authorized party 120 to download 180 the electronic document 80 from the electronic document repository 70. In the preferred embodiment of the present invention, a subsequent authorized party 120 downloads 180 the electronic document 80 using an access password 200 supplied by the electronic transaction manager 50. In another embodiment, an authorized party 120 downloads the electronic document 80 using an access password 200 supplied by the customer 5. In either embodiment, the access password 200 is additional and different from the initial password 54 assigned to the electronic document 80. No subsequent authorized party 120 shall have the same access password 200 as another authorized party 120 nor shall they have access to any access password 200 other than their own.

Figure 4C:
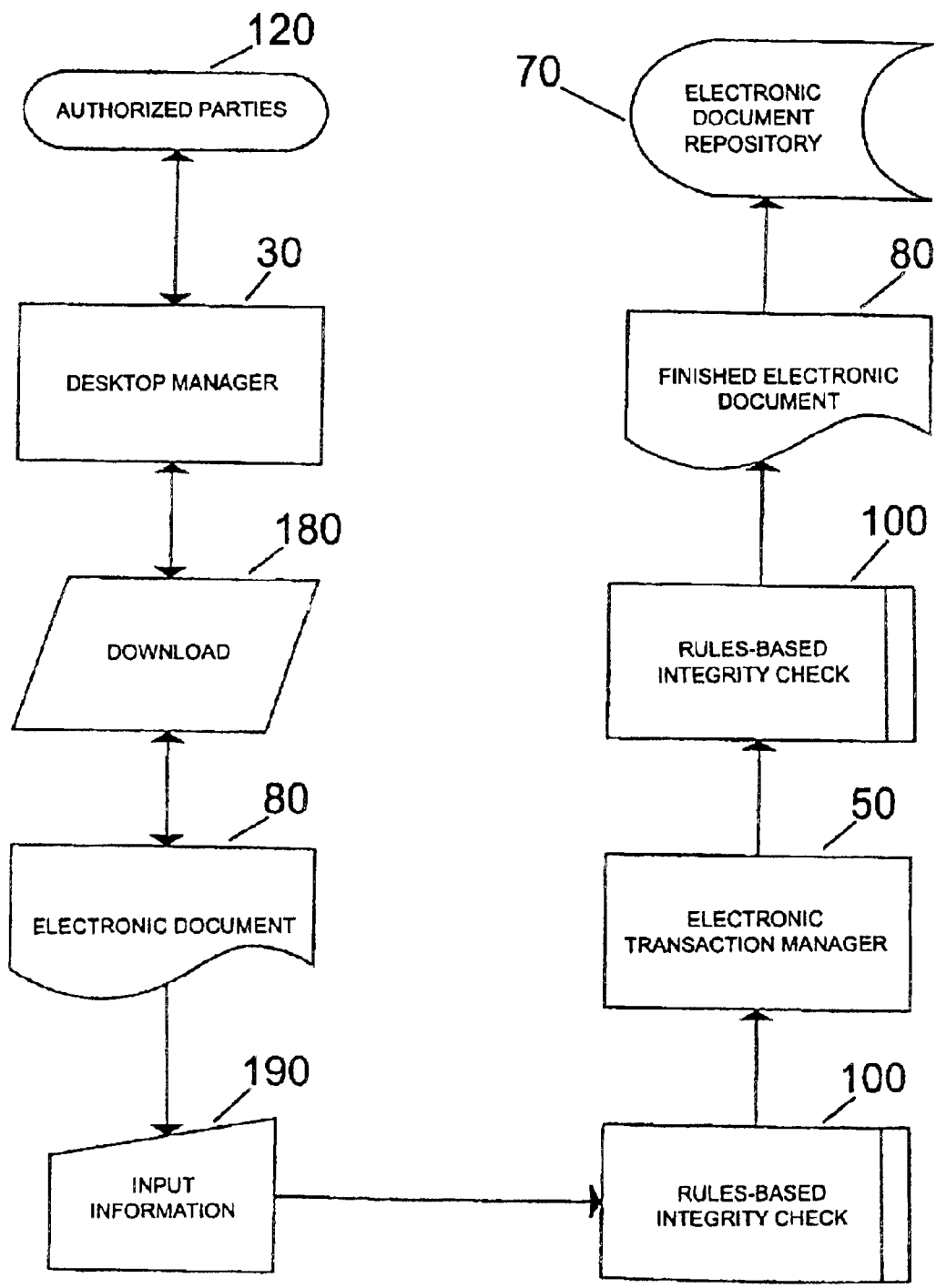

With reference to FIG. 4C, a subsequent authorized party 120 utilizes the present invention per the same method as did the customer 5. That is, an authorized party 120 runs the desktop manager 30 on a customer local computer system 20 and downloads the electronic document 80 using the document name 53 and the access password 200. The desktop manager 30 displays the electronic document 80 on the browser 21 of the customer local computer system 20, and indicates where information is to be input 190 into the electronic document 80 per the methods described above. The other authorized party 120 inputs the required information 190 where indicated by the desktop manager 30 and uploads the electronic document 80 to the electronic document repository 70 to be managed by the electronic transaction manager 50. The electronic transaction manager 50 may post several copies of the electronic document 80 so that several other authorized parties 120 may access the electronic document 80 singularly or simultaneously in time, each using their own unique access password 200. Upon a determination by the electronic transaction manager 50 that all of the required information is input 190 into the electronic document 80 by the customer 5 and each of the authorized parties 120 identified in the registration account 55, the electronic transaction manager 50 amalgamates the information from every party into a single finalized electronic document 80.

Figure 5A:
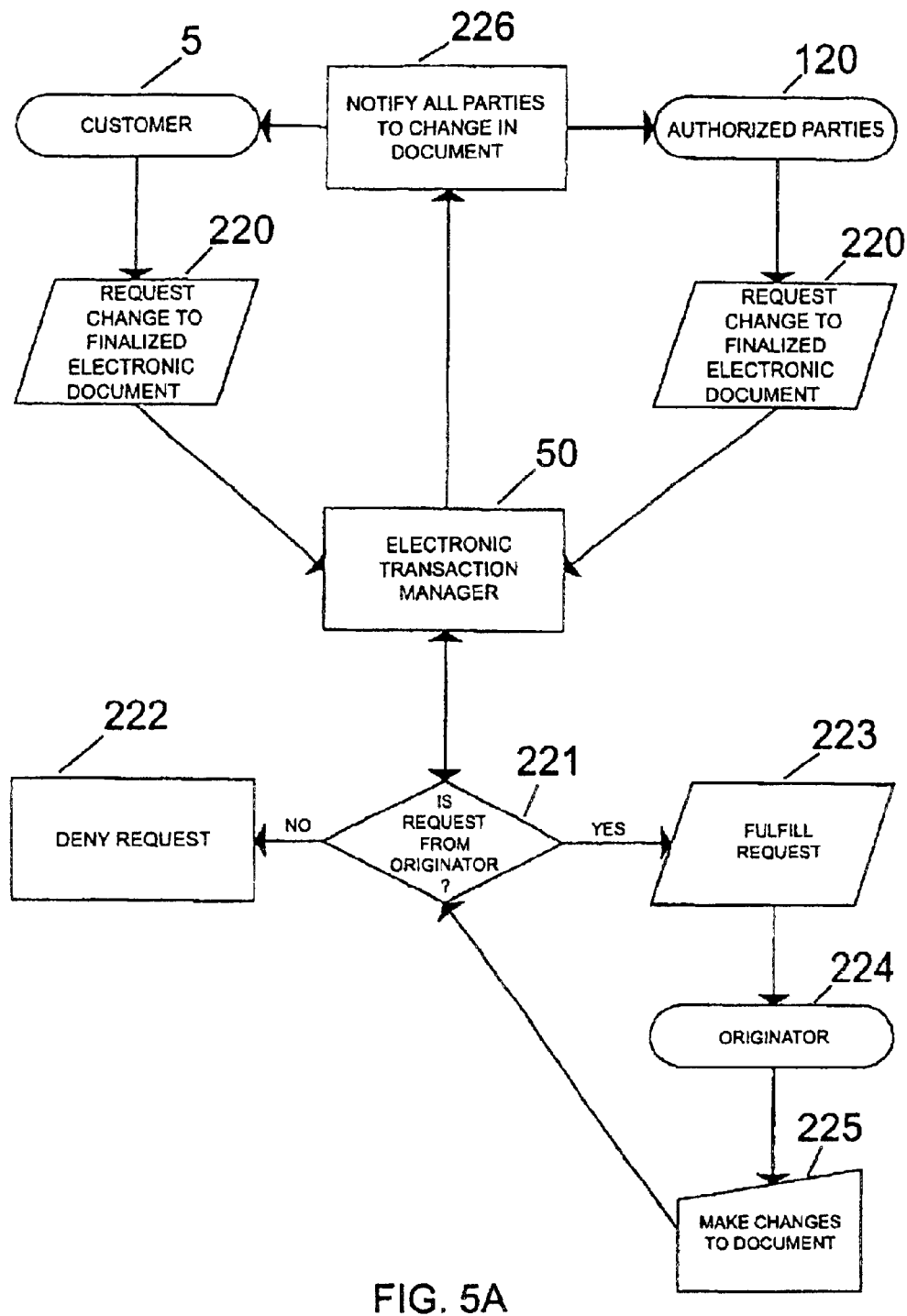
FIGS. 5A–5B are flow chart diagrams that illustrate changes made to previously entered information and the processing of such changes according to the method of the present invention.
Figure 5B:
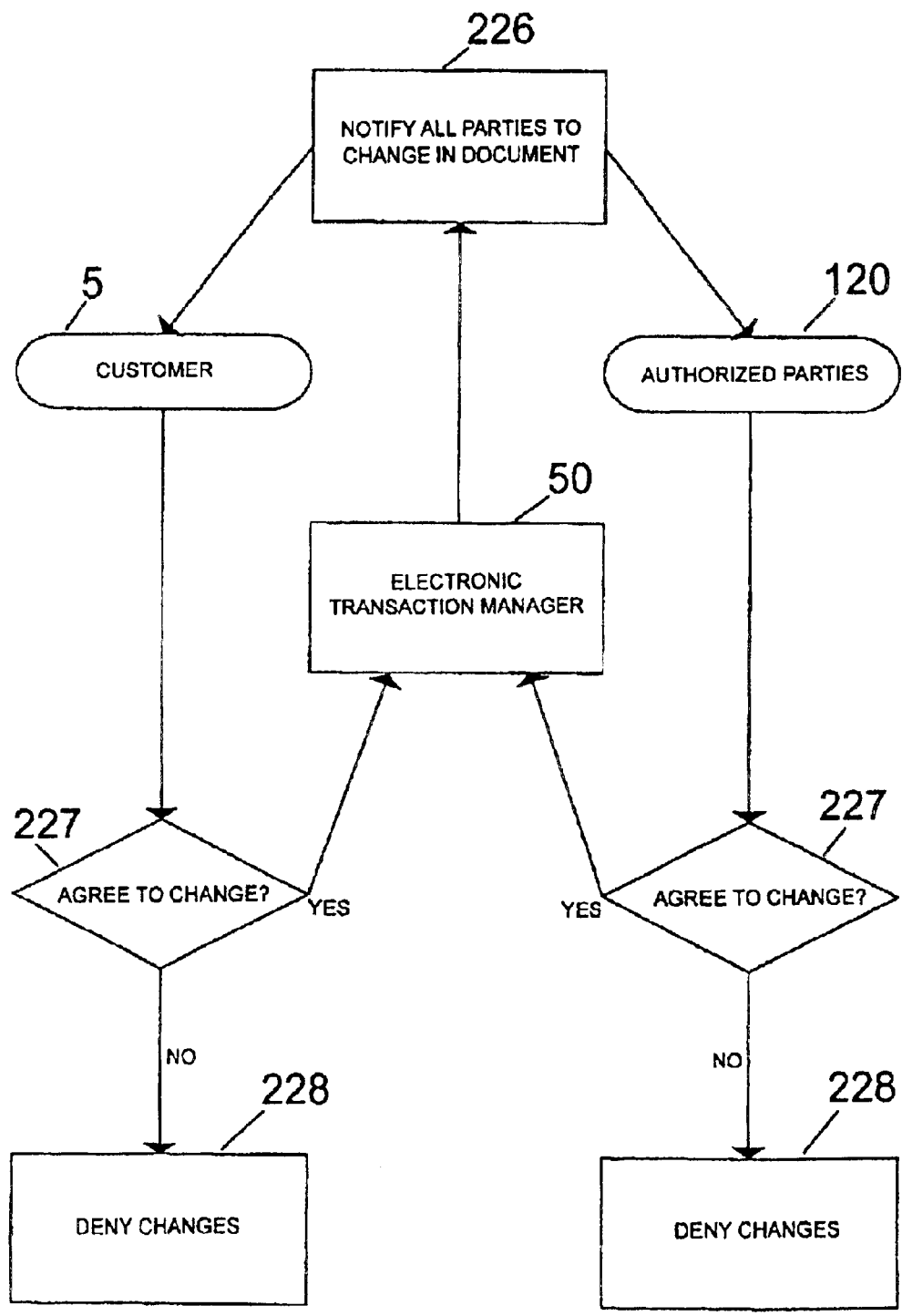

With reference to FIGS. 5A and 5B, only the originator 224 of the information input 190 into the electronic document 80 (whether it be a customer 5 or other authorized party 120) may alter or otherwise change such information after the originator 224 has successfully uploaded the electronic document 80 to the electronic document repository 70. Should the originator 224 of the information, wish to add, delete or otherwise modify information after posting the electronic document 80 for retrieval by a subsequent authorized party 120, the electronic transaction manager 50 automatically executes a rules-based integrity check 100 to the changed information. The rules-based integrity check 100 executes upon the originator 224 of information re-posting the electronic document 80 to the electronic document repository 70. The rules-based integrity check 100 compares the modified information in the electronic document 80 with the original information in the electronic document 80. The rules-based integrity check 100 compares the modified information with the original information and extracts the specific modifications that have been made to the electronic document 80. The electronic transaction manager 50 notifies 226 each party to the transaction via the electronic transaction status board 110 that the electronic document 80 has been modified, and the time and date of the modification. The electronic transaction manager 50 further identifies the party 224 that made the modification and specifies what modifications have been made to the electronic document 80. Each party to the transaction must respond to the electronic transaction manager 50 by way of an affirmative action 227, such as activating an "I Accept" icon, or some variation thereof, prior to the electronic transaction manager 50 accepting the modified electronic document 80 to be posted in the electronic document repository 70.

The electronic transaction manager 50 further consists of an electronic transaction status board 110. The electronic transaction status board 110 functions as an on-line virtual message communication center. The electronic transaction status board 110 automatically receives tracking information from the electronic transaction manager 50 that consists of the electronic document transaction 90. That is, upon a successful upload of the electronic document 80 to the electronic document repository 70, irrespective of the point in the transaction cycle, the electronic transaction manager 50 automatically posts the time, date, and the party that posted the electronic document 80 to the electronic transaction status board 110. Likewise, the electronic transaction manager 50 posts when a transaction cycle is complete, including the time and date of notarization 164 on the electronic transaction status board 110. The electronic transaction status board 110 further functions as a virtual message center where the various parties to the transaction may inform one another of the respective status of the electronic document 80, i.e. a lender may be waiting on an appraisal, or the signatory 130 may be ill and unable to conclude the transaction at this point in time. Likewise, the parties may post questions or requests for other parties on the electronic transaction status board 110. The electronic transaction status board 110 allows the parties to the transaction to have constant and instant information and communication that is readily accessible. However, access to the electronic transaction status board 110 is password protected and only the customer 5 and subsequent authorized parties 120 may access the electronic transaction status board 110. Each party to the transaction is assigned an individual electronic message board that resides in electronic transaction status board 110. Each individual electronic message board is unique to the corresponding party, and access to input information into an individual electronic message board is restricted to the corresponding party to whom it is registered. Nonetheless, each party may view the contents of any one of the individual electronic message boards.

Figure 6A:
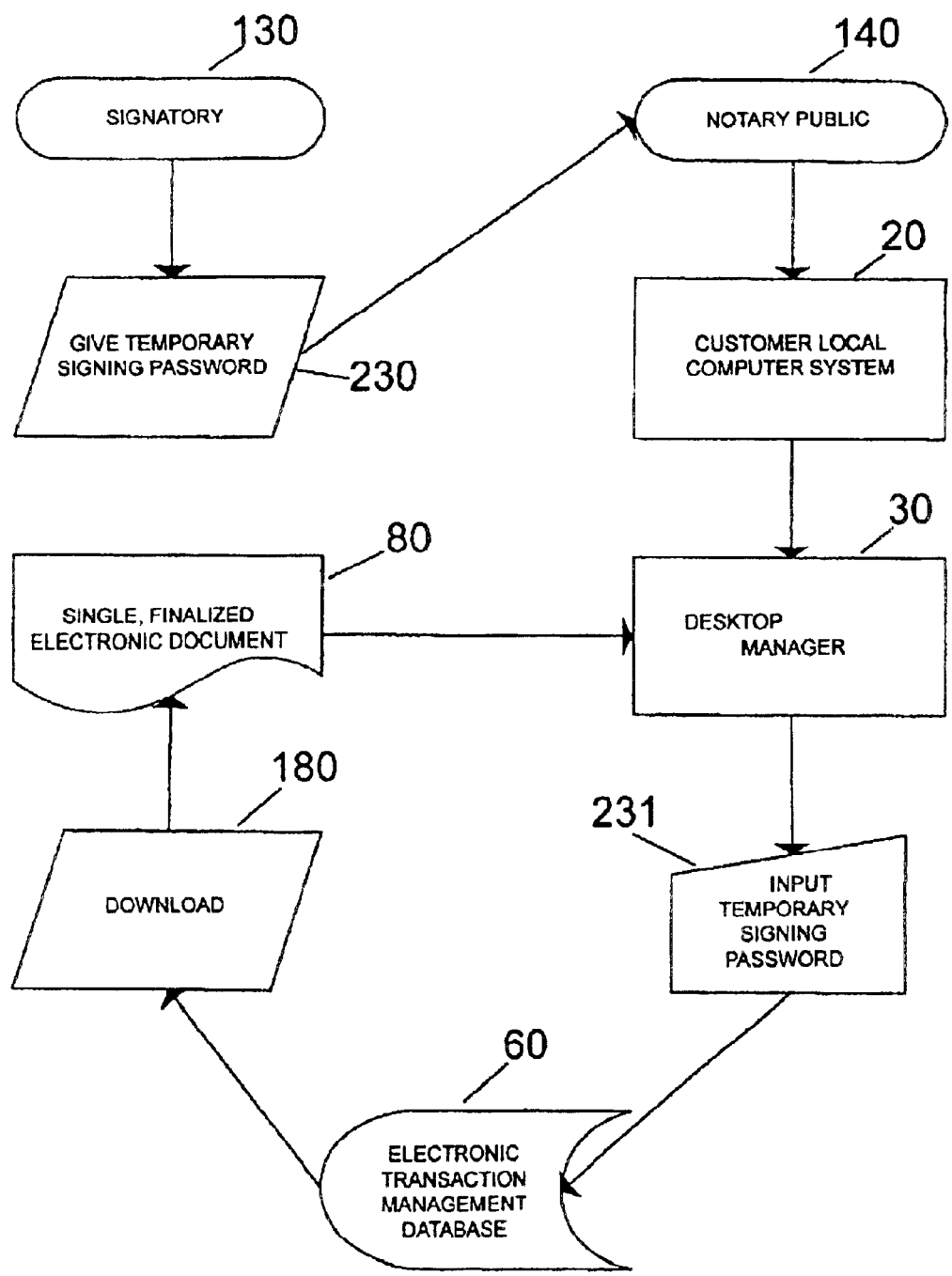
FIGS. 6A–6B are flow chart diagrams that illustrate the process of accessing and displaying an electronic document for signature verification according to the method of the present invention.

With reference to FIG. 6, the electronic transaction manager 50 determines when the electronic document 80 is ready to be electronically signed by the signatory 130. The electronic document 80 is ready for signature when all of the required electronic documents 80 needed to complete the transaction are uploaded into the electronic document repository 70, and the rules-based integrity check 100 ensures that all of the required information 190 is completed in each of the electronic documents 80. Upon a determination that the electronic document 80 is ready for signature, the electronic transaction manager 50 encrypts the electronic document 80 and applies a time and a date stamp. Too, at this time, the electronic transaction manager 50 assigns a temporary signing password 230 to each signatory 130. Each signatory 130 is given a temporary signing password 230 that is unique to the signatory 130. No two signatories 130 shall have a common temporary signing password 230. The electronic transaction manager 50 registers each temporary signing password 230 with the correlating electronic document 80 to be signed in the electronic transaction manager database 60. The temporary signing password 230 is a function of the electronic transaction manager 50 and is distinct from the initial password 53 assigned to the electronic document 80, and from the access password 200 assigned to the subsequent authorized party 120.

The electronic transaction manager 50 alerts the signatory 130 that the electronic document 80 is ready to be electronically signed 135 and electronically notarized 150. Likewise, the electronic transaction manager 50 disseminates the temporary signing password 230 to the signatory 130 along with a list of locations for a notary public 140 with the means to electronically notarize 150 the electronic document 80 according to the present invention. The signatories 130 may be geographically remote, as in different states or countries, each utilizing a different notary public 140 who shall access the same electronic document 80 from the electronic repository 70 for notarization 150. The signatory 130 discloses the name of the electronic document 80 and the corresponding temporary signing password 230 to the notary public 140. Using the temporary signing password 230, the notary public 140 downloads the electronic document 80 from the electronic document repository 70 using a customer local computer system 20 that runs the desktop manager 30.

Figure 6B:
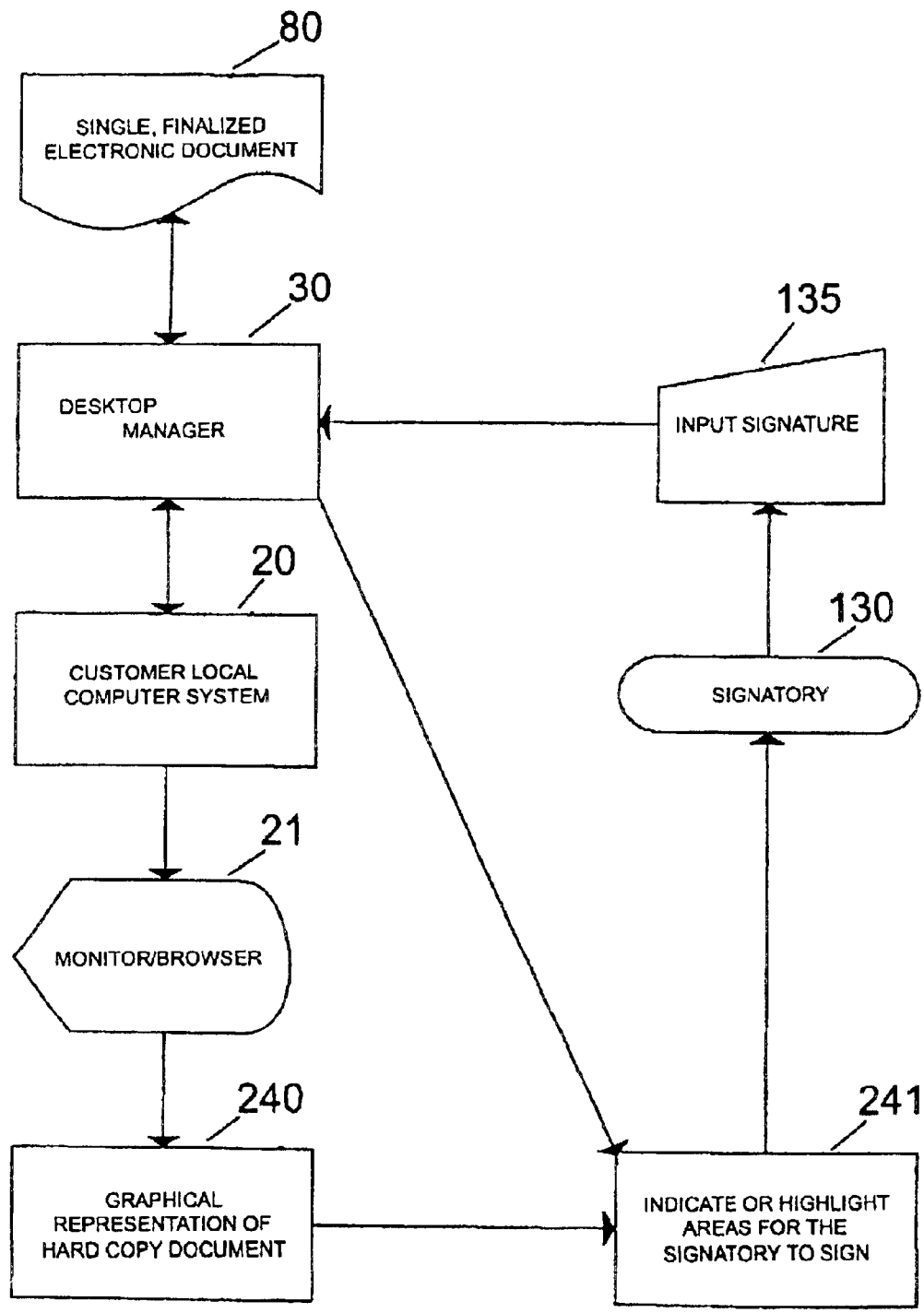

With reference to FIG. 6B, after reviewing the electronic document 80 in the presence of the notary public 140, the signatory 130 affixes an actual hand-written signature to the electronic document 80 using the electronic signature input device 135. The desktop manager 30 highlights or otherwise indicates 241 each and every place where a signature or initials is required in the electronic document 80 that appears on the browser 21 of the customer local computer system 20 as a graphical representation 240. Indication will typically appear as an icon such as an arrow or some other pointing device that physically demonstrates on the browser 21 of the customer local computer system 20 which part of the electronic document 80 the signatory 130 is initializing or signing. To ensure the signor's intent, each place indicated by the desktop manager 30 requiring a signature or initials must be physically input using the electronic signature input device 135. That is, the desktop manager 30 will not replicate signatures if multiple signatures are required in the electronic document 80, but mandate that the signatory 130 sign each place in the electronic document 80 where indicated by the desktop manager 30, 241.

Figure 7A:
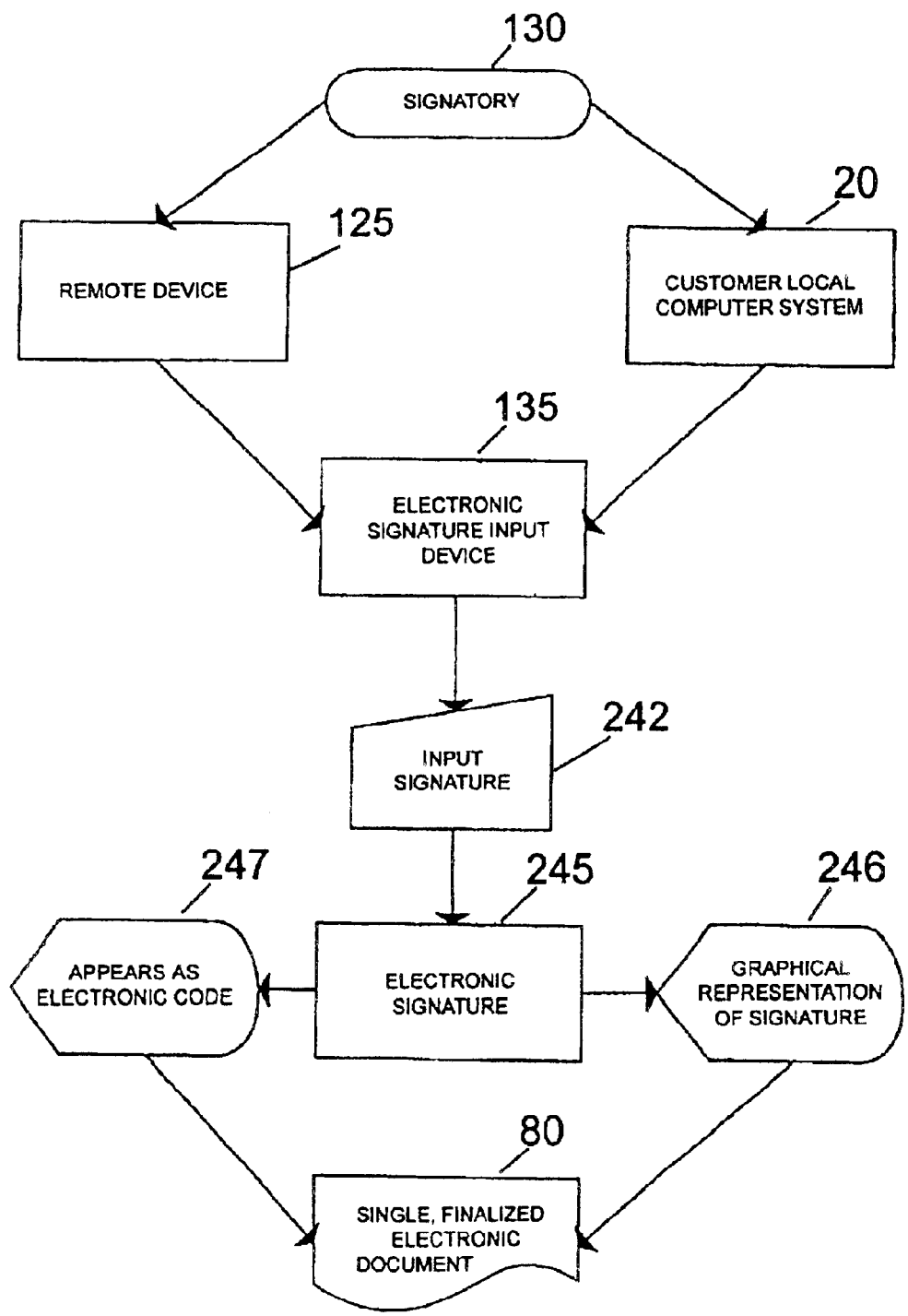
FIGS. 7A–7B are flow chart diagrams that illustrate the customer and notary public electronically signing the electronic document according to the method of the present invention.

With reference to FIG. 7A, the signatory's 130 actual hand-written signature 245 is captured by way of an electronic signature input device 135, and affixed to the electronic document 80 by the desktop manager 30. The electronic signature input device 135 may be a part of the customer local computer system 20 or a device external to it 125. The electronic signature input device 135 utilizes the traditional pen and ink method of physically signing one's own signature. The desktop manager 30 electronically affixes 242 the signature to the electronic document 80 as a graphical representation 246. Alternatively, the electronic signature 245 captured by the electronic signature input device 135 may be encrypted as a code 247 that is unique to the signatory 130 and linked with the corresponding electronic document 80.

Figure 7B:
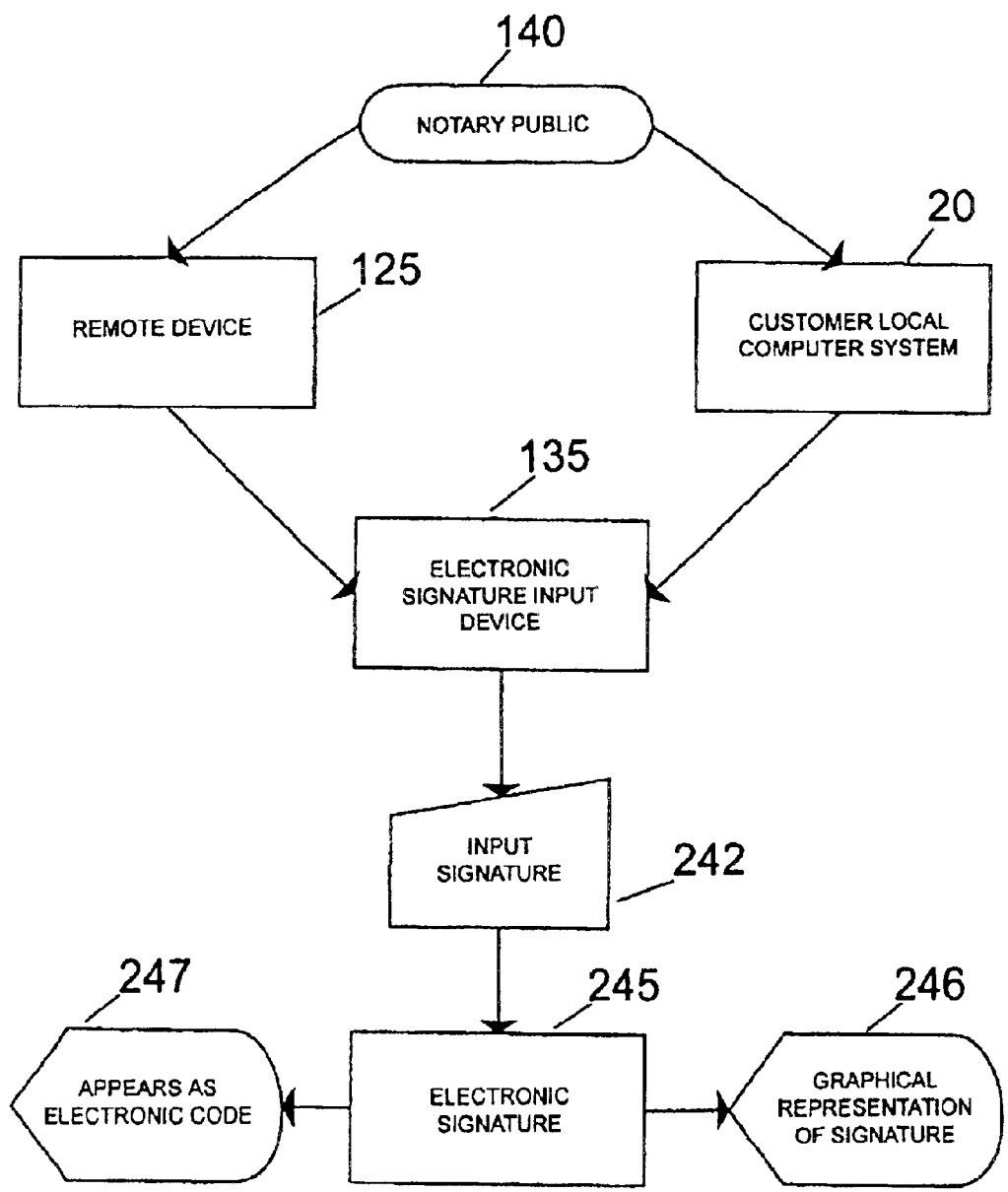

With reference to FIG. 7B, upon witnessing the signatory 130 physically sign the electronic document 80, the notary public 140 affixes an actual hand-written signature 245 to the electronic document 80 where indicated by the desktop manager 30, using the electronic signature input device 135. Per the method referenced above, the desktop manager 30 will not replicate the notary public's 140 signature 245 if multiple signatures are required, but mandate that the notary public 140 sign each place where indicated by the desktop manager 30. Per the method above, the electronic signature input device 135 utilizes the traditional pen and ink method whereby the notary public 140 physically signs the electronic document 80 that appears as a graphical representation 240 of the hard copy document it replaces. The electronic signature of the notary public 140 appears on the electronic document 80 as a graphical representation 246. Alternatively, the electronic signature 245 captured by the electronic signature input device 135 may be encrypted as a code 247 that is unique to the notary public 140 and linked with the corresponding electronic document 80.

Figure 8:
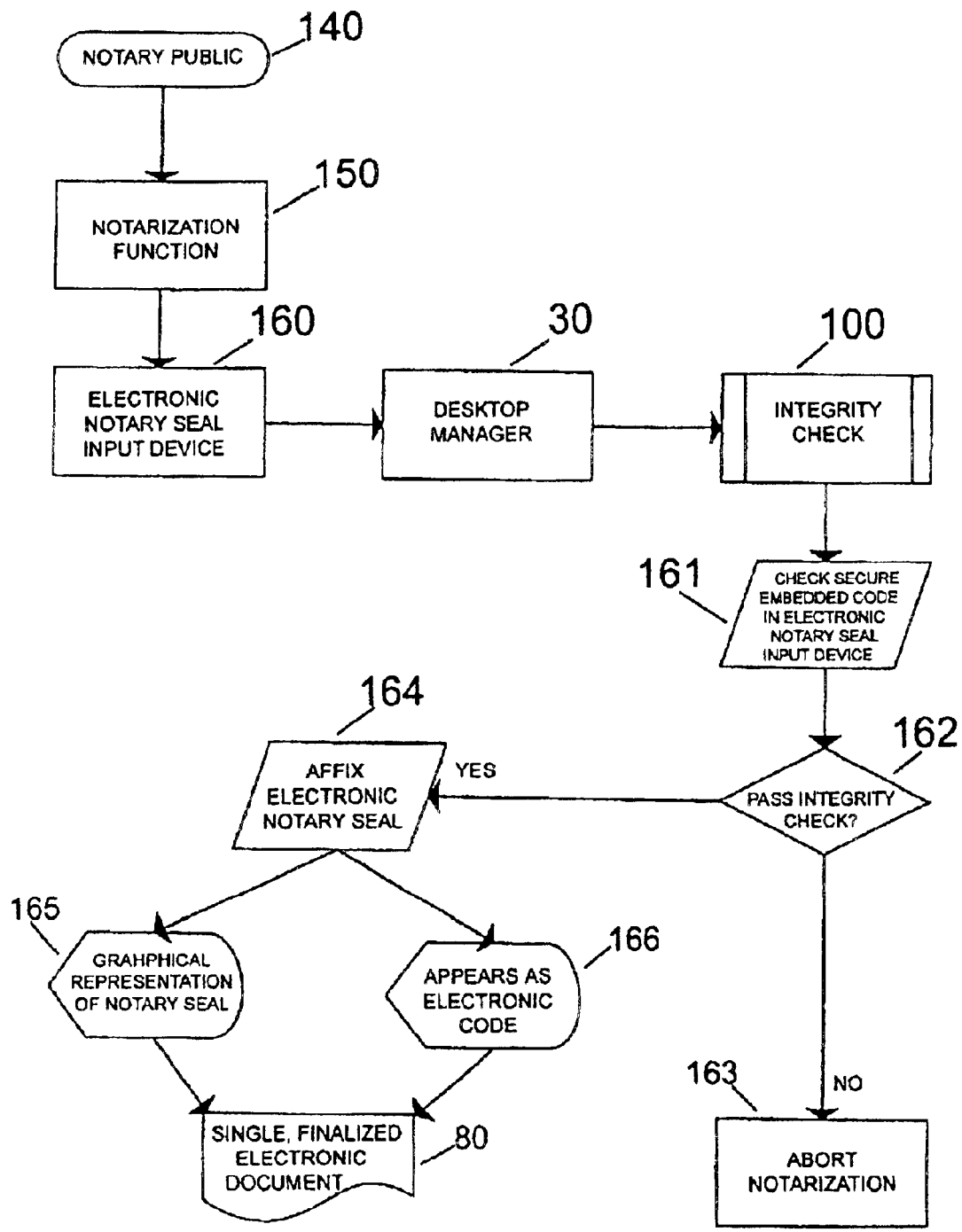
FIG. 8 is a flow chart diagram that illustrates the notary public notarizing the electronic document according to the method of the present invention.

With reference to FIG. 8, after affixing a signature 245 to the electronic document 80, the notary public 140 affixes an electronic notary seal 150 to the electronic document 80. The notary public 140 electronically affixes the seal to the electronic document 80 using the electronic notary seal input device 160. The electronic notary seal input device 160 is independent of the desktop manager 30 but operates only in conjunction with the desktop manager's 30 notarization function. The desktop manager's 30 notarization function only operates when activated by the electronic notary seal input device 160. The electronic notary seal input device 160 may be a function embedded in the customer local computer system 20 or a portable device that attaches to the customer local computer system 20. In the preferred embodiment pf the present invention, the electronic notary seal input device 160 is a remote device that remains in the sole possession of the notary public 140. The notarization function of the desktop manager 30 will only run when the electronic notary seal input device 160 is attached to the customer local computer system 20. The remote electronic notary seal input device 160 is a hardware-based security portable device that attaches to the serial or parallel printer port of the customer local computer system 20, including a laptop. The remote electronic notary seal input device 160 utilizes a hardware key that uses codes and passwords embedded inside the key to control access to the desktop manager's 30 notarization function. While activated, the electronic notary seal input device 160 receives encoded data from the desktop manager 30 and decodes it in a way that cannot be imitated. The decoded data that is returned from the remote electronic notary seal input device 160 is deployed in the desktop manager 30 so that it affects the mode in which the manager 30 executes the notarization function. The remote electronic notary seal input device 160 is programmed to execute a notarization 164 upon a verified match 162 with the desktop manager 30. After decoding, a verified match 162 will execute the notarization function of the desktop manager 30 that in turn activates the execution of the electronic notary seal which is embedded in the remote electronic notary seal input device 160. The desktop manager 30 indicates by way of an arrow or an icon that appears on the browser 21 of the customer local computer system 20 where the electronic seal shall be input and appear on the electronic document 80. In the preferred embodiment of the present invention, the notary seal appears as a graphical representation 165 of a traditional notary seal on the electronic document 80. The graphical representation 165 may include an encrypted code that is affixed to the electronic document 80 that contains the date and time the notary public's 140 seal was affixed and the verification information of the notary public 140 provided in the notary public's registration account 55. As stated, verification information consists of that information required by law to license and register the notary public.

Alternatively, the remote electronic notary seal input device 160 may input an electronic notary seal in the form of an encrypted barcode 166 that appears on the electronic document 80. The notary barcode seal 166 of the remote electronic notary seal input device 160 is verified by the desktop manager 30 that utilizes a secure server database specifically configured to authenticate the notary barcode seal 166. The notarization function of the desktop manager will only execute upon a verification from the secure server of a positive code match with the notary barcode seal 166 embedded in the remote electronic notary seal device 160. A standard barcode reader uses light to convert the notary barcode into an electrical signal. The barcode reader measures the relative widths of the bars and spaces of the notary barcode, translates the code into regular characters, and transports the translation to the host computer server 40. Each notary barcode seal 166 begins with a special start character and ends with a special stop character. The notary barcode seal 166 may include a checksum character just before the stop character. The checksum is calculated using the characters in the notary barcode seal 166 before the notary barcode seal 166 may be affixed to the electronic document 80. The barcode reader performs the same calculation and compares its answer to the checksum it read at the end of the notary barcode seal. If the two calculations do not match, the barcode reader shall invalidate the notary barcode seal 166. The barcode of the present invention is not a standard bar code scheme that is typically obtained from an independent party, rather the barcode is a proprietary-based, secure software application embedded in the remote electronic notary seal input device 160. The data in a bar code denotes a reference number that the secure server utilizes to look up the associated computer record that contains descriptive verification data of the notary public 140 to whom the corresponding barcode seal is registered to. The barcode may further contain the date and time the notary public's 140 seal was affixed and the verification information for the notary public 140.

Figure 9:
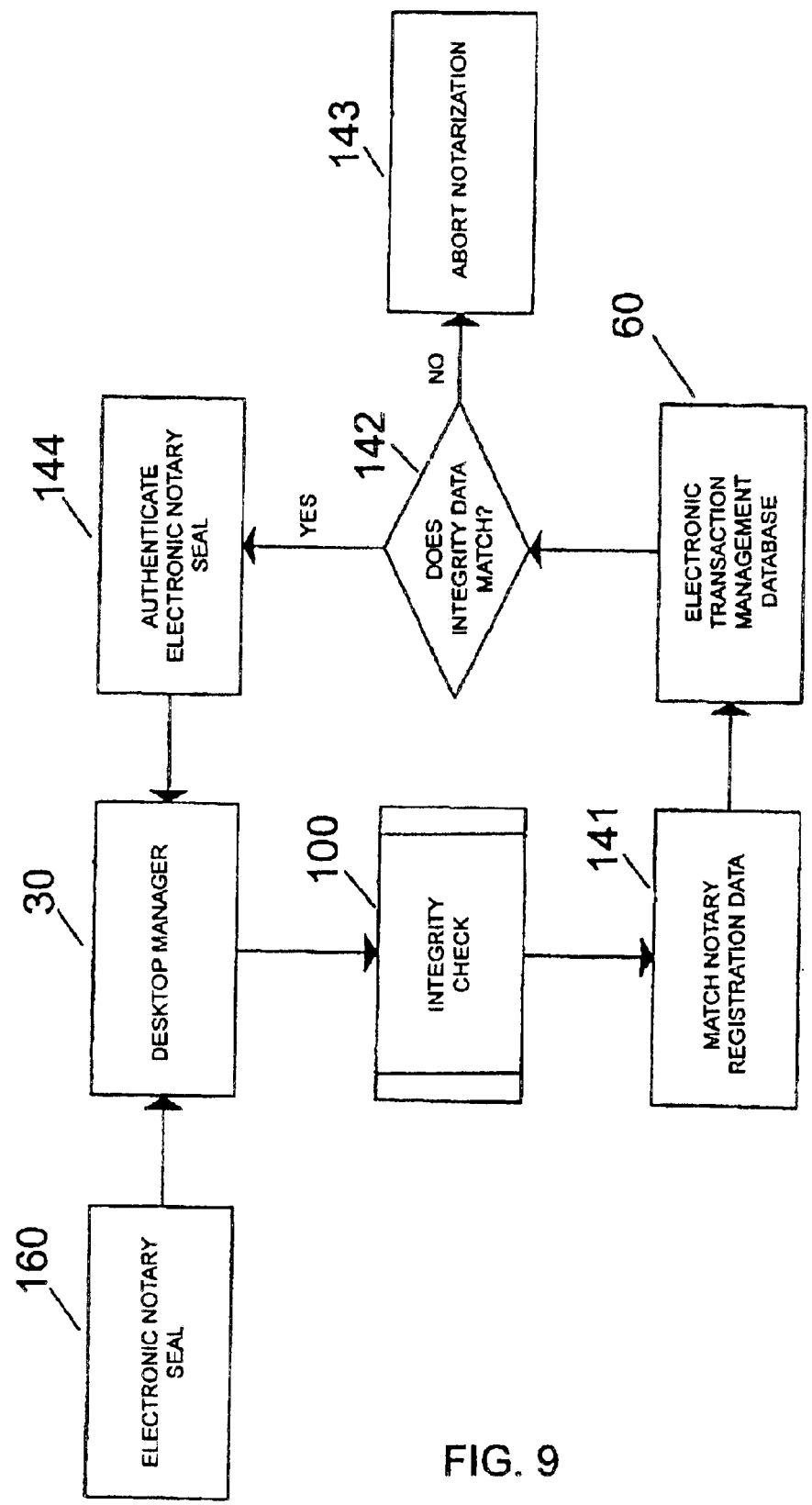
FIG. 9 is a flow chart diagram that illustrates verifying the notary public according to the method of the present invention.

With reference to FIG. 9, the remote electronic notary seal input device 160 is pre-configured uniquely for each notary public 140 and is registered to the notary public 140. Each electronic notary seal input device 160 contains a particular serial number assigned and registered to the notary public 140 by the electronic transaction manager 50. The desktop manager 30 verifies that the serial number associated with the remote electronic notary seal input device 160 is an authorized, registered device. The notarization function of the desktop manager 30 will run with only upon verification of registration. The notary public 140 may choose to add extra coding to the remote electronic notary seal input device 160 in the form of a password or code for additional security. The portable hardware device allows the notary public 140 to have sole control and possession of the electronic notary seal input device 160, thereby securing compliance with prevailing governmental regulations. The portable hardware device further allows the notary public 140 to electronically notarize electronic documents 80 wherever the customer local computer system 20 has access to the internet or TCP/IP connectivity 10, including a laptop. The portable hardware device is easily transportable and can be used at diverse locations to another without a cumbersome uninstall/install process.

Figure 10:
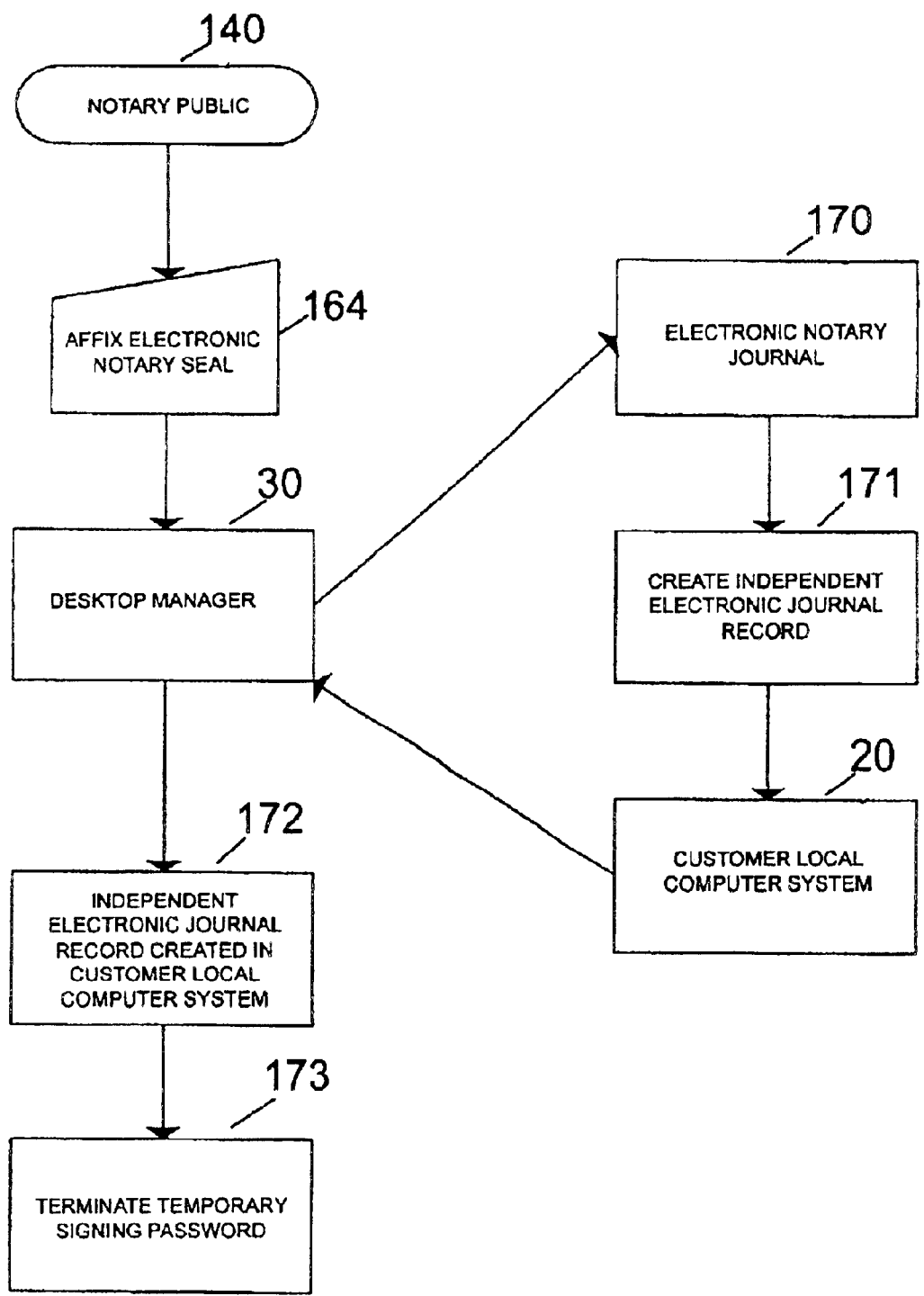
FIG. 10 is a flow chart diagram that illustrates the execution of the notary public journal according to the present invention.

With reference to FIG. 10, upon affixing the notary signature and seal, the desktop manager 30 automatically executes the electronic notary journal 170. The electronic notary journal 170 creates an independent electronic record 171 of the notarization transaction. The electronic notary journal 170 contains all of the information required by law to legally enforce the notarization of the electronic document 80. Upon recording the notarization transaction in the electronic notary journal 170, the desktop manager 30 encrypts the signed, notarized, electronic document 80 and applies a time and date stamp. Any changes made to the electronic document 80 after this point in time invalidate the notary public's seal. The signed, notarized, electronic document 80 is uploaded by the notary public 140 onto the host computer server 40. Upon uploading the electronic document 80 to the host computer server 40, the temporary signing password 230 terminates. A signatory 130 to the electronic document 80 may have the notary public 140 print a hard copy of the electronic document 80 out, if so desired. The host computer server 40 archives the electronic document 80 for future use and retrieval by approved parties.

What is claimed:

1. A method for providing and performing electronic notary services using a paperless electronic document platform, the internet or other TCP/IP (Transmission Control Protocol/Internet Protocol) based network, a customer local computer system, a desktop manager, a host computer server, an electronic transaction manager, an electronic transaction manager database, an electronic document repository, an electronic document, an electronic transaction, a rules-based integrity check, an electronic transaction status board, notarization processes, an electronic signature input device, an electronic notary seal input device, and an electronic notary journal, said method comprising the steps of:

a. a customer using said customer local computer system to access said host computer server;

b. said customer using said customer local computer system to register with said electronic transaction manager;

c. said customer using said local computer system to access said electronic document repository;

d. said customer using said local computer system to download said electronic document from said electronic document repository to said customer local computer system;

e. said electronic transaction manager assigning a document name to said electronic document;

f. said electronic transaction manager assigning an initial password to said electronic document;

g. said customer using said customer local computer system to input information into said electronic document;

h. said desktop manager executing said rules-based integrity check;

i. said customer using said customer local computer system to upload said electronic document to said electronic document repository from said customer local computer system;

j. said electronic transaction manager executing said rules-based integrity check;

k. said electronic transaction manager recording said electronic document transaction in said electronic transaction manager database;

l. said customer using said customer local computer system to input information into said electronic transaction status board;

m. said electronic transaction manager notifying other authorized parties that said electronic document is ready for retrieval by said other authorized parties;

n. said electronic transaction manager assigning an access password to said other authorized parties;

o. said other authorized parties using said customer local computer system to download said electronic document from said electronic document repository to said customer local computer system of said other authorized parties, using said access password;

p. said other authorized parties using said customer local computer system to input information into said electronic document;

q. said desktop manager executing said rules-based integrity check;

r. said other authorized parties using said customer local computer system to upload said electronic document to said electronic document repository;

s. said electronic transaction manager executing said rules-based integrity check;

t. said electronic transaction manager recording said electronic document transaction in said electronic transaction manager database;

u. said other authorized parties using said customer local computer system to input information into said transaction status board;

v. said electronic transaction manager determining when said electronic document is ready for signature and notarization;

w. said electronic document transaction manager assigning a temporary signing password to said electronic document;

x. said electronic document transaction manager notifying a signatory required to sign said electronic document when said electronic document is ready for signature, and furnishing said signatory said temporary signing password;

y. said signatory accessing a notary public, whereby said notary public downloads said electronic document from said electronic document repository using said temporary signing password given to said notary public by said signatory;

z. said electronic signature input device obtaining the electronic, manual, handwritten signature of said signatory;

aa. said desktop manager simultaneously affixing said electronic, manual, handwritten signature of said signatory to said electronic document;

bb. said electronic signature input device obtaining the electronic, manual, handwritten signature of said notary public;

cc. said desktop manager simultaneously affixing said electronic, manual, handwritten signature of said notary public to said electronic document;

dd. said electronic notary seal input device affixing an electronic notary seal to said electronic document;

ee. said desktop manager executing said rules-based integrity check to verify said electronic notary seal is authentic;

ff. said desktop manager recording said notarization processes in said electronic notary journal;

gg. said desktop manager terminating said temporary signing password and encrypting said electronic document;

hh. said notary public uploading said electronic document to said electronic document repository;

ii. said electronic transaction manager executing said rules-based integrity check; and jj. said electronic transaction manager archiving said electronic document for future use, reference or retrieval.

2. The method of claim 1 whereby said desktop manager further comprises the step of said desktop manager highlights or otherwise indicates each place in said electronic document where the electronic signature of said signatory is to be input into said single, finalized electronic document.

3. The method of claim 2 whereby said signatory inputs said electronic signature into said single, finalized electronic document using said electronic signature input device; and whereby said desktop manager affixes said electronic signature in the designated places of said single, finalized document.

4. The method of claim 3 whereby said electronic signature input device may be a remote device or a function of said customer local computer system, and whereby said electronic signature appears as a graphical representation of said signatory's manual, hand-written signature.

5. The method of claim 3 whereby said electronic signature input device may be a remote device or a function of said customer local computer system; and whereby said eletronic signature of said signatory appears in the form of an electronic code.

6. The method of claim 1 whereby said customer establishes a registration account with said electronic transaction manager, whereby said customer inputs verification information to establish said registration account.

7. The method of claim 1 whereby said notary public establishes a registration account with said electronic transaction manager, whereby said notary public inputs verification information to establish said registration account.

8. The method of claim 1 whereby said electronic document repository further comprises a variety of said electronic documents and a plurality of said electronic documents; said electronic documents being represented by category or by type of said electronic document.

9. The method of claim 1 whereby said electronic transaction manager further comprises the step of assigning a unique code or reference number to each said electronic document stored in said electronic document repository; said code or said reference number in said electronic transaction manager database for internal management and tracking of said electronic document.

10. The method of claim 1 whereby said desktop manager further comprises the step of accessing said electronic document repository and selecting said electronic document or a plurality of said electronic document for download to said customer local computer system.

11. The method of claim 1 whereby said electronic transaction manager further comprises the step of assigning a document name and an initial password to said electronic document that is downloaded to said customer local computer system from said electronic document repository.

12. The method of claim 1 whereby said electronic transaction manager further comprises the step of said customer assigning said document name and said initial password to said electronic document that is downloaded to said customer local computer system from said electronic document repository.

13. The method of claim 1 whereby said electronic transaction manager further comprises the step of recording the code or the reference number assigned to said electronic document, said document name assigned to said electronic document, and said initial password assigned to said electronic document in said registration account of said customer for internal management and tracking of said electronic document by said electronic transaction manager.

14. The method of claim 1 whereby said desktop manager further comprises the step of displaying an image of said electronic document on the browser of said customer local computer system, wherein said image being a representation of the hard copy paper document said electronic document replaces.

15. The method of claim 1 whereby said desktop manager further comprises the step of said desktop manager highlighting or otherwise indicates where said information is to be input into said electronic document by said customer, and whereby said customer inputs said information into said electronic document from said customer local computer system.

16. The method of claim 1 whereby said desktop manager further comprises the steps of downloading and uploading said electronic document from said customer local computer system to said electronic document repository.

17. The method of claim 1 whereby said document desktop manager further comprises said rules-based integrity check; said rules-based integrity check comprising a logic process that is executed prior to uploading said electronic document to said electronic document repository from said customer local computer system.

18. The method of claim 1 whereby said electronic transaction manager further comprises said rules-based integrity check; said rules-based integrity check further comprising a logic process that is executed after downloading and uploading said electronic document to said electronic document repository from said customer local computer system.

19. The method of claim 1 whereby said electronic transaction manager further comprises said electronic transaction status board; said electronic transaction status board further comprising the step of said electronic transaction manager automatically inputs said information regarding said electronic document into said electronic transaction status board.

20. The method of claim 1 whereby said electronic transaction manager further comprises an electronic transaction manager database; said transaction manager database further comprising the step or recording said functions of said electronic transaction manager.

21. The method of claim 1 whereby said electronic transaction manager further comprises the step of assigning an access password to said electronic document for retrieval from said electronic document repository by said other authorized parties; wherein each said access password of said other authorized parties is unique.

22. The method of claim 1 whereby said electronic transaction manager further comprises the step of notifying said other authorized parties are notified when said electronic document is ready for retrieval from said electronic document repository.

23. The method of claim 1 whereby said electronic transaction manager further comprises the step of said access password assigned to said electronic document is disseminated to said other authorized parties.

24. The method of claim 1 whereby said desktop manager further comprises the step of said other authorized parties download said electronic document from said electronic document repository to said customer local computer system using said access password assigned to said electronic document.

25. The method of claim 1 whereby said other authorized parties utilize said desktop manager in the same manner and function as did said customer to download said electronic document, input said information into said electronic document, and upload said electronic document to said electronic document repository; said electronic document being subject to said rules-based integrity check by said desktop manager prior to said upload and to said rules-based integrity check by said electronic transaction manager after said upload.

26. The method of claim 1 whereby said electronic transaction manager further comprises the step of said other authorized parties may access multiples copies of said electronic document singularly, or simultaneously, from said electronic document repository, wherein said multiple copies of said electronic document are identical in form and substance.

27. The method of claim 26 whereby said electronic transaction manager further comprises the step of compiling said information input singularly and simultaneously into said copies of said electronic document by said other authorized parties into a single, finalized electronic document.

28. The method of claim 27 whereby said electronic transaction manager further comprises the step of determining when said single, finalized electronic document is ready for signature and notarization.

29. The method of claim 28 whereby said electronic transaction manager further comprises the step of: notifying the signatory that said single, finalized electronic document is ready for signature and; and disseminating said temporary signing password to said signatory.

30. The method of claim 27 whereby said electronic transaction manager further comprising the step of to allow said customer or said other authorized parties to change said information in said single, finalized electronic document, and whereby only the originator who input said information into said electronic document may alter said information.

31. The method of claim 30 further comprising the step of said electronic transaction manager notifies said customer and said other authorized parties when said originator of said information alters said information; and whereby said electronic transaction manager requires said customer and said other authorized parties to expressly agree to said alter of said information.

32. The method of claim 27 whereby said electronic transaction manager further comprises the step of assigning a temporary signing password to said single, finalized electronic document.

33. The method of claim 27 whereby said desktop manager further comprises the step of said notary public downloads said single, finalized electronic document from said electronic document repository using said customer local computer system and said temporary signing password supplied by said signatory.

34. The method of claim 27 whereby said desktop manager further comprises the step of displaying a graphical image of said single, finalized electronic document on the browser of said customer local computer system, wherein said graphical image is a representation of the hard copy paper document said single, finalized electronic document replaces.

35. The method of claim 27 whereby said desktop manager further comprises the step of said desktop manager highlights or otherwise indicates each place in said single, finalized electronic document where the electronic signature of said notary public is to be input into said single, finalized electronic document.

36. The method of claim 35 whereby said notary public inputs said electronic signature into said single, finalized electronic document using said electronic signature input device; and whereby said desktop manager affixes said electronic signature in the designated places of said single, finalized document.

37. The method of claim 36 whereby said electronic signature input device may be a remote device or a function of said customer local computer system; and whereby said electronic signature appears as a graphical representation of said notary public's manual, hand-written signature.

38. The method of claim 36 whereby said electronic signature input device may be a remote device or a function of said customer local computer system; and said electronic signature of said notary public appears in the form of an electronic code.

39. The method of claim 35 or claim 2 whereby said desktop manager further comprises the step of requiring a separate electronic signature for each place said electronic signature is required in said single, finalized electronic document; and whereby said desktop manager will not replicate said electronic signature should multiple electronic signatures be required.

40. The method of claim 27 whereby said desktop manager further comprises the step of said desktop manager highlights or otherwise indicates each place where an electronic notary seal is to be input into said single, finalized electronic document.

41. The method of claim 27 whereby said electronic notary seal input device further comprises the step of said notary public affixes said electronic notary seal to said single, finalized electronic document where indicated by said desktop manager.

42. The system of claim 41 whereby said desktop manager further comprises said rules-based integrity check, whereby said electronic notary seal input device must match a secure code embedded in said desktop manager in order to affix said electronic notary seal to said single, finalized electronic document.

43. The method of claim 41 further comprises said electronic notary seal may appear as a graphical representation on said single, finalized electronic document or may appear in the form of an electronic barcode on said single, finalized electronic document.

44. The method of claim 27 whereby said desktop manager further comprises the step of encrypting said single, finalized electronic document in order to prohibit any changes being made to said single, finalized electronic document.

45. The method of claim 27 whereby said desktop manager further comprises the step of said notary public uploads said single, finalized electronic document to said electronic repository.

46. The method of claim 27 whereby said electronic transaction manager further comprises the step of archiving said single, finalized electronic document for future use or retrieval.

47. The method of claim 1 whereby said desktop manager further comprises the step of said desktop manager highlights or otherwise indicates each place in said electronic document where the electronic signature of said signatory is to be input into said single, finalized electronic document.

48. The method of claim 47 whereby said signatory inputs said electronic signature into said single, finalized electronic document using said electronic signature input device; and whereby said desktop manager affixes said electronic signature in the designated places of said single, finalized document.

49. The method of claim 1 whereby said customer local computer system of said customer further comprises said desktop manager; said desktop manager further comprising the step of using means for said computer local computer system to interface with said host computer server, said electronic transaction manager, said electronic transaction manager database, said electronic document repository, said electronic document, said rules-based integrity check, said electronic transaction status board, said notarization processes, said electronic signature input device, said electronic notary seal input device, and said electronic notary journal.

50. The method of claim 1 whereby said customer local computer system of said notary public further comprises said desktop manager; said document manager further comprising the step of using means for said customer local computer system of said notary public to interface with said host computer server, said electronic transaction manager, said electronic transaction manager database, said electronic document repository, said electronic document, said rules-based integrity check, said electronic transaction status board, said notarization processes, said electronic signature input device, said electronic notary seal input device, and said electronic notary journal.

51. The method of claim 1 whereby said rules-based integrity check of said desktop manager further comprises the step of authenticating said electronic notary seal by matching the verification information associated with said notary seal to said registration account of said notary public.

52. The method of claim 1 whereby said desktop manager further comprises said electronic notary journal; said electronic notary journal further comprising the information required by the governing law of the state or country of said notary public to legally enforce said notarization processes.

53. The method of claim 52 further comprises the step of upon said notary public affixing said electronic notary seal to said single, finalized electronic document, said desktop manager executes said notary journal whereby an independent electronic notary journal record of said notary public is created on said customer local computer system.

54. The method of claim 1 whereby said desktop manager further comprises the step of terminating said temporary signing password upon said desktop manager creating said independent electronic notary journal record.

55. A method for providing and performing using a paperless electronic transaction document platform, the internet or other TCP/IP (Transmission Control Protocol/Internet Protocol) based network, a customer local computer system, a desktop manager, a host computer server, an electronic transaction manager, an electronic transaction manager database, an electronic document repository, an electronic document, an electronic transaction, a rules-based integrity check, an electronic transaction status board, an electronic signature input device, said method comprising the steps of:

a. a customer using said customer local computer system to access said host computer server;

b. said customer using said customer local computer system to register with said electronic transaction manager;

c. said customer using said local computer system to access said electronic document repository;

d. said customer using said local computer system to download said electronic document from said electronic document repository to said customer local computer system;
e. said electronic transaction manager assigning a document name to said electronic document;
f. said electronic transaction manager assigning an initial password to said electronic document;
g. said customer using said customer local computer system to input information into said electronic document;
h. said desktop manager executing said rules-based integrity check;
i. said customer using said customer local computer system to upload said electronic document to said electronic document repository from said customer local computer system;
j. said electronic transaction manager executing said rule-based integrity check;
k. said electronic transaction manager recording said electronic document transaction in said electronic transaction manager database;
l. said customer using said customer local computer system to input information into said electronic transaction status board;
m. said electronic transaction manager notifying other authorized parties that said electronic document is ready for retrieval by said other authorized parties;
n. said electronic transaction manager assigning an access password to said other authorized parties;
o. said other authorized parties using said customer local computer system to download said electronic document from said electronic document repository to said customer local computer system of said other authorized parties, using said access password;
p. said other authorized parties using said customer local computer system to input information into said electronic document;
q. said desktop manager executing said rules-based integrity check;
r. said other authorized parties using said customer local computer system to upload said electronic document to said electronic document repository;
s. said electronic transaction manager executing said rules-based integrity check;
t. said electronic transaction manager recording said electronic document transaction in said electronic transaction manager database;
u. said other authorized parties using said customer local computer system to input information into said transaction status board;
v. said electronic transaction manager determining when said electronic document is ready for signature;
w. said electronic document transaction manager assigning a temporary signing password to said electronic document;
x. said electronic document transaction manager notifying the signatory required to sign said electronic document when said electronic document is ready for signature, and furnishing said signatory said temporary signing password;
y. said electronic signature input device obtaining the electronic, manual, handwritten signature of said signatory;
z. said desktop manager simultaneously affixing said electronic, manual, handwritten signature of said signatory to said electronic document;
aa. said desktop manager terminating said temporary signing password and encrypting said electronic document;
bb. said electronic transaction manager executing said rules-based integrity check; and
cc. said electronic transaction manager archiving said electronic document for future use, reference or retrieval.

* * * * *